(12) United States Patent
Eardley

(10) Patent No.: US 8,473,633 B2
(45) Date of Patent: Jun. 25, 2013

(54) METHOD OF ROUTING PACKETS IN A PACKET NETWORK

(75) Inventor: Philip L Eardley, Ipswich (GB)

(73) Assignee: British Telecommunications public limited company, London (GB)

( * ) Notice: Subject to any disclaimer, the term of this patent is extended or adjusted under 35 U.S.C. 154(b) by 2452 days.

(21) Appl. No.: 10/537,896

(22) PCT Filed: Dec. 30, 2003

(86) PCT No.: PCT/GB03/05661
§ 371 (c)(1),
(2), (4) Date: Jun. 7, 2005

(87) PCT Pub. No.: WO2004/059922
PCT Pub. Date: Jul. 15, 2004

(65) Prior Publication Data
US 2006/0101157 A1    May 11, 2006

(30) Foreign Application Priority Data
Dec. 31, 2002    (GB) .................................. 0230330.3

(51) Int. Cl.
*G06F 15/173*    (2006.01)
(52) U.S. Cl.
USPC ......................................................... 709/239
(58) Field of Classification Search
USPC ......................................................... 709/238
See application file for complete search history.

(56) References Cited

U.S. PATENT DOCUMENTS

| 5,117,422 A | 5/1992 | Hauptschein et al. |
| 5,371,738 A | 12/1994 | Moelard et al. |

(Continued)

FOREIGN PATENT DOCUMENTS

| AU | 5424496 | 10/1996 |
| AU | 5424696 | 10/1996 |

(Continued)

OTHER PUBLICATIONS

PCT International Search Report.

(Continued)

*Primary Examiner* — Kevin Bates
*Assistant Examiner* — Tom Y Chang
(74) *Attorney, Agent, or Firm* — Nixon & Vanderhye P.C.

(57) ABSTRACT

A method of routing packets in a packet network is disclosed. The packet network includes a chain of packet nodes, the chain comprising a first and second access node for communicating with one or more mobile nodes and one or more intermediate packet nodes providing a path interconnecting the first and second access nodes. Previous methods are inefficient and lead to additional overhead. The method comprises the steps of: installing, in said intermediate packet nodes, first routing data defining a first routing path in one direction along said chain to a mobile node via said first access node and second routing data defining a second routing path in the opposite direction along said chain to said mobile node via said second access node; operating each of said intermediate packet nodes to: determine, on receipt of a packet destined for said mobile node, whether said packet is from another node on said chain or not; and a) if the packet is determined to be from a node not on said chain, copying the packet and routing said copy along one of said routing paths and routing said packet along the other of said routing paths; and b) if the packet is determined to be from another node on said chain, route said packet along said chain only in the direction in which it is currently travelling.

11 Claims, 18 Drawing Sheets

U.S. PATENT DOCUMENTS

| | | | |
|---|---|---|---|
| 5,375,140 | A | 12/1994 | Bustamante et al. |
| 5,384,826 | A | 1/1995 | Amitay |
| 5,400,338 | A | 3/1995 | Flammer |
| 5,528,583 | A | 6/1996 | Acampora et al. |
| 5,533,026 | A | 7/1996 | Ahmadi et al. |
| 5,623,534 | A | 4/1997 | Desai et al. |
| 5,729,549 | A | 3/1998 | Kostreski et al. |
| 5,751,707 | A | 5/1998 | Voit et al. |
| 5,754,546 | A | 5/1998 | Voit et al. |
| 5,822,324 | A | 10/1998 | Kostresti et al. |
| 6,002,677 | A | 12/1999 | Javitt et al. |
| 6,038,450 | A | 3/2000 | Brink et al. |
| 6,081,524 | A | 6/2000 | Chase et al. |
| 6,094,437 | A | 7/2000 | Loehndorf et al. |
| 6,130,898 | A | 10/2000 | Kostreski et al. |
| 6,473,411 | B1 | 10/2002 | Kumaki et al. |
| 7,327,671 | B2 * | 2/2008 | Karino et al. ............... 370/219 |
| 2002/0089958 | A1 | 7/2002 | Feder et al. |
| 2002/0141360 | A1 * | 10/2002 | Baba et al. ............... 370/331 |

FOREIGN PATENT DOCUMENTS

| | | |
|---|---|---|
| EP | 0 660 632 | 6/1995 |
| EP | 0 737 019 | 10/1996 |
| EP | 0 740 440 | 10/1996 |
| EP | 0 777 396 | 6/1997 |
| EP | 0 829 985 | 3/1998 |
| EP | 0 835 034 | 4/1998 |
| EP | 0 862 344 | 9/1998 |
| EP | 0 883 266 | 12/1998 |
| EP | 0 889 667 | 1/1999 |
| EP | 0 902 551 | 3/1999 |
| EP | 1 011 241 | 6/2000 |
| JP | 10-93634 | 4/1998 |
| JP | 11-178036 | 7/1999 |
| WO | WO 95/30192 | 11/1995 |
| WO | WO 96/05704 | 2/1996 |
| WO | WO 96/28903 | 9/1996 |
| WO | WO 96/28904 | 9/1996 |
| WO | WO 98/47302 | 10/1998 |
| WO | WO 00/44133 | 7/2000 |
| WO | WO 01/06717 | 1/2001 |
| WO | WO 01/06732 | 1/2001 |
| WO | WO 01/61394 | 8/2001 |
| WO | WO 01/99457 | 12/2001 |

OTHER PUBLICATIONS

"Tutorial: Mobile Networking Through Mobile IP", Charles E. Perkins, IEEE Internet Computing Oneline, 1997, 12 pgs.

"IP Micro-Mobility Support Using HAWAII", R. Ramjee et al., Feb. 19, 1999, posted on the Internet Engineering Taskforce Internet site at http://www.ietf.org/internet-drafts/draft-rimjee-micro-mobility-hawaii-00.txt, 27 pgs.

"A Highly Adaptive Distributed Routing Algorithm for Mobile Wireless Networks" Vincent D. Park et al., Proceedings of INFOCOM '97, Apr. 7-11, Kobe, Japan, 9 pgs.

"A Performance Comparison of the Temporally-Ordered Routing Algorithm and Ideal Link-State Routing" Vincent D. Park et al., Proceedings of ISCC '98, Jun. 30-Jul. 2, 1999, 7 pgs.

"Architectural Considerations for Mobile Mesh Networking", S. Corson et al, May 1996, 21 pgs.

Highly Dynamic Destination-Sequenced Distance-Vector Routing (DSDV) for Mobile Computers:, Charles E. Perkins et al., ACM SIGCOMM 1994, 11 pgs.

"Providing Continuous Network Access to Mobile Hosts using TCP/IP", Charles Perkins, Computer Networks and ISDN Systems vol. 26 (1993), pp. 357-369.

"Cellular IP—A New Approach to Internet Host Mobility", A.G. Valko, Jan. 1999, ACM Comput. Commun. Review, pp. 50-65.

"IP Addressing and Routing in a Local Wireless Network", Danny Cohen et al., IEEE INFOCOM 1992, pp. 626-632.

"Hawaii: A Domain-Based Approach for Supporting Mobility in Wide-Area Wireless Networks", R. Ramjee et al., Proceedings of the International Conference on Networking Protocols (ICNP), Nov. 3, 1999, pp. 283-292.

"A Protocol for Seamless Communication in a Picocellular Network", Rohit Ghai et al., May 1994, In Proc. IEEE Supercomm/ICC, pp. 192-196.

"Multicast Communications—Protocols and Applications", Ralph Wittman et al., May 12, 2000, Morgan Kaufman Publishers, San Diego, pp. 105-121.

"An Effective Spanning Tree Algorithm for a Bridged LAN", N. F. Huang et al., Mar. 1992, International Workshop on Advanced Communications and Applications for High Speed Networks (IWACA '92), Munich, Germany, pp. 43-49.

"Edge Mobility Architecture", A. O'Neill et al., Jul. 2000, posted on http://www.comet.columbia.edu/micomobility/pub/draft-oneill-ema-02.txt, 29 pgs.

"A Two-Phase Inter-Switch Handoff Scheme for Wireless ATM Networks", K. Salah et al., Oct. 1998, IEEE ATM 98 Workshop Proceedings, pp. 708-713.

"Adaptive Routing in Burroughs Network Architecture", Jeffrey L. Rosenberg et al., Aug. 17, 1987, Computer Communications Review, US Association for Computing Machinery, vol. 17, No. 5, pp. 173-184.

"Paging Support for IP Mobility using HAWAII", R. Ramjee et al., Jun. 25, 1999, posted on the Internet Engineering Taskforce Internet site at http://www.ietf.org/internet-drafts/draft-ietf-mobileip-paging-hawaii-00.txt, 18 pgs.

"P-MIP: Minimal Paging Extensions for Mobile IP", X. Zhang et al., Jul. 2000, posted on the Internet Engineering Taskforce Internet site at http://www.ietf.org/internet-drafts/draft-zhang-pmip-00.txt, 15 pgs.

"Source-Specific Multicast for IP", H. Holbrook et al., Mar. 9, 2000, posted on the Internet Engineering Taskforce Internet site at http://www.ietf.org./internet-drafts/draft-holbrook-ssm-00.txt, 15 pgs.

"Cellular IP", A. Campbell et al., Dec. 1999, posted on the Internet Engineering Taskforce Internet site at http://www.ietf. org/internet-drafts/draft-ietf-mobileip-cellularip-00.txt, 21 pgs.

"Host Specific Routing", Alan O'Neill et al., Nov. 2000, posted on the Internet Engineering Taskforce Internet site at http://www.ietf.org./internet-drafts/draft-oneill-li-hsr-00.txt, 9 pgs.

"State Transfer between Access Routes during Handoff", A. O'Neill et al., Aug. 2000, posted on the Internet Engineering Taskforce Internet site at http://www.ietf.org/internet-drafts/draft-oneill-handoff-state-00.txt, 5 pgs.

"IPv4 over Mobile IPv6 for Dual Stack nodes", G. Tsirtsis et al., Aug. 2000, posted on the Internet Engineering Taskforce Internet site at http://www.ietf.org/internet-drafts/draft-tsirtsis-v4-over-mipv6-00.txt, 4 pgs.

"Generalized IP Handoff", A. O'Neill et al., Aug. 2000, posted on the Internet http://www.ietf.org/internet-drafts/draft-oneill-craps-handoff-00.txt, 14 pgs.

"EMA Enhanced Mobile IPv6/IPv4", A. O'Neill et al., Jul. 2000, posted on the Internet Engineering Taskforce Internet site at http://www.ietf.org/internet-drafts/draft-oneill-ema-mip-00.txt, 37 pgs.

"Host Extensions for IP Multicasting", S. Deering, Aug. 1989, Internet Engineering Taskforce Request for Comment (RFC) 1112, posted on the Internet Engineering Taskforce Internet site at http://www.ietf.org.rfc/rfc1112.txt, 15 pgs.

"IP Mobility Support", C. Perkins, Oct. 1996, Internet Engineering Taskforce Request for Comment 2002, posted on the Internet Engineering Taskforce Internet site at http://www.ietf.org/rfc/rfc2002.txt, 66 pgs.

"On Dynamically Adapting Registration Areas to User Mobility Patterns in PCS Networks", Georgios Varsamopolous et al., Sep. 1999, In Proc. Int'l Workshop on Collaboration and Mobile Computing (IWCMC'99), Aizu, Japan, 6 pgs.

"Mobile User Registration in Cellular Systems with Overlapping Location Areas", Daqing Gu et al., May 1999, Proceedings of the 50th Vehicular Technology Conference, pp. 802-806.

"Extending Mobile IP with Adaptive Individual Paging: A Performance Analysis", Claude Castelluccia, 2000, In Proc. IEEE Symposium on Computer and Communications, pp. 113-118.

"A Hierarchial Multiresolution Registration Structure for Mobility Tracking", Leandros Tassiulas et al., Sep. 1996, Proceedings of the 5$^{th}$ International Conference on Universal Personal Communications, Boston, MA, pp. 617-622.

"Distributed Algorithms for Generating Loop-Free Routes in Networks with Frequently Changing Topology", Eli M. Gafni et al., Jan. 1981, IEEE Transactions on Communications, vol. 29, No. 1, pp. 11-18.

"Location Tracking Mechanisms for Optimal Mobility Adaption", Leandros Tassiulas et al., Oct. 1996, 34$^{th}$ Annual Allerton Conf. on Communications, Control and Computing, pp. 855-864.

\* cited by examiner

Fig.2.

| Host IP Address (or Prefix) | Own Primary Height | Neighbour ID | Neighbour Primary Height | Primary Link ID | Primary Link State | Own Secondary Height | Neighbour ID | Neighbour Secondary Height | Secondary Link ID | Secondary Link State |
|---|---|---|---|---|---|---|---|---|---|---|
| IP1 | $H_i$ (IP1) | W | $HN_{iw}$ (IP1) | L1 | U | $H_i$:S (IP1) | W | $HN_{iw}$:S (IP1) | L1:S | D |
|  |  | X | $HN_{ix}$ (IP1) | L2 | D |  | X | $HN_{ix}$:S (IP1) | L2:S | U |
|  |  | Y | $HN_{iy}$ (IP1) | L3 | D |  | Y | $HN_{iy}$:S (IP1) | L3:S | U |
|  |  | Z | $HN_{iz}$ (IP1) | L4 | – |  | Z | $HN_{iz}$:S (IP1) | L4:S | – |
| IP2 | $H_i$ (IP2) | W | $HN_{iw}$ (IP2) | L1 | D | $H_i$:S (IP2) | W | $HN_{iw}$:S (IP2) | L1:S | U |
|  |  | X | $HN_{ix}$ (IP2) | L2 | U |  | X | $HN_{ix}$:S (IP2) | L2:S | D |
|  |  | Y | $HN_{iy}$ (IP2) | L3 | U |  | Y | $HN_{iy}$:S (IP2) | L3:S | D |
|  |  | Z | $HN_{iz}$ (IP2) | L4 | – |  | Z | $HN_{iz}$:S (IP2) | L4:S | – |
| ... |  | ... | ... | ... | ... |  | ... | ... | ... | ... |

Fig.3.

| Host IP Address (Or Prefix) | Link ID | Secondary Link ID |
|---|---|---|
| IP1 | L2 | L1:S |
| IP2 | L1 | L3:S |
| ... | ... | ... |

METHOD OF ROUTING PACKETS IN A PACKET NETWORK

This application is the US national phase of international application PCT/GB2003/005661 filed 30 Dec. 2003 which designated the U.S. and claims benefit of GB 0230330.3, dated 31 Dec. 2002, the entire content of which is hereby incorporated by reference.

This invention relates to routing in communications networks.

In a packet switched network, such as the Internet, it is desirable to allow a host that is wirelessly connected to the network, to change its point of attachment to the network. Such a point of attachment is called an access node (also sometimes called a base station) and such a host is called a mobile host. It is further desirable to allow the mobile host to change its access node during a data transfer without requiring reconfiguration by the user. A change in access node while connectivity is maintained is known as handover.

The International Patent Application published as WO01/06717 describes a handover method. Before handover, data packets destined for a mobile host are forwarded to the mobile host from a pre-handover access node known as an old access node. During handover, a link is established between the mobile host and a post-handover access node known as a new access node. Subsequently a routing update is sent from the new access node to the old access node and the link between the mobile host and the old access node is torn down.

There will be a period of time before the routing update has reached the old access node when data packets continue to arrive at the old access node even in situations where the link between the mobile host and old access node has been torn down. Therefore, a temporary, short-term tunnelling mechanism is provided whereby data packets destined for the mobile host and arriving at the old access node are encapsulated in the payload field of an outer packet and sent to the new access node. At the new access node the data packet is decapsulated and forwarded to the mobile host.

The International Patent Application published as WO01/61934 describes a handover method known in the art as 'soft-handover' whereby the mobile host is able to communicate with both the old and new access nodes during handover. Under such a condition, data packets arriving at the old access node are 'bi-cast' so that they reach the mobile host directly via the old access node as well as indirectly via the tunnel leading from the old access node to the new access node. Bi-casting is a process where identical data is transmitted simultaneously to two different destinations.

The problem with both these handover methods is that, physically, data packets are likely to traverse some of the same links twice leading to additional overhead. For example, the first link of the tunnel is likely to be the same as the final link to the old access node. Therefore, data packets will traverse this link once en-route towards the old access node and once in encapsulated form en-route from the old access node to the new access node via the tunnel. Furthermore, data packets (and their copies) will arrive at the new access node significantly later than at the old access node and this can lead to problems such as data packets being received out of order at the mobile host.

"Cellular IP" (see <draft-ietf-mobileip-cellularip-00.txt> of the Internet Engineering Task Force) introduces a concept of 'semi-soft' handover in which data packets are bi-cast to the old and new access nodes upon reaching a node (hereinafter the branching node) where the paths to the old access node and new access node diverge.

In a Cellular IP network there is one node, the gateway node, that connects the Cellular IP network to another IP network. In Cellular IP all the traffic originating from a mobile host must pass through this gateway node even if it is communicating with another mobile host within the Cellular IP network. Where an intra-network communication such as this is taking place, each mobile host will send packets along a path leading from the mobile host to the gateway node. The gateway node will then forward these data packets down a path towards the other mobile host. The two paths will diverge at some point—in situations where this point is not the gateway node itself, each data packet will travel back and forth along the shared path between the gateway node and the branching node at which the paths diverge again leading to additional overhead.

According to a first aspect of the present invention there is provided a method of routing packets in a packet network, said packet network including a chain of packet nodes, said chain comprising first and second access nodes for communicating with one or more mobile nodes and one or more intermediate packet nodes, said one or more intermediate packet nodes providing a path interconnecting said first and second access nodes, said method comprising the steps of:

installing, in said intermediate packet nodes, first routing data defining a first routing path in one direction along said chain to a mobile node via said first access node and second routing data defining a second routing path in the opposite direction along said chain to said mobile node via said second access node;

operating each of said intermediate packet nodes to:

determine, on receipt of a packet destined for said mobile node, whether said packet is from another node on said chain or not; and a) if the packet is determined to be from a node not on said chain, copying the packet and routing said copy along one of said routing paths and routing said packet along the other of said routing paths; and b) if the packet is determined to be from another node on said chain, route said packet along said chain only in the direction in which it is currently travelling.

By installing, in each node on a path extending from the old access node to the new access node, two routing entries providing routes to a mobile node in opposite directions along the path, and operating each node to prevent a packet from being forwarded along the link via which it arrived at a node, a packet addressed to the mobile node is forwarded both to the old access node and the new access node thereby providing soft-handover without turning packets back along the link via which they arrived. This results in a more efficient routing of packets.

In preferred embodiments, the packet carries a unique address of the mobile node and preferably the unique address is the same before and after a handover of the mobile node from the first access node to the second access node. In this way there is no need to set up and tear down connections between the mobile node and access nodes each time the mobile node moves, as would be required in an Asynchronous Transfer Mode (ATM) network, for example.

Preferably the method further comprises operating each node in the packet network:

a) to associate a routing value with said unique address;

b) responsive to the receipt of said packet at said node to forward said packet towards another node having a lower routing value associated with said unique address;

c) responsive to the creation of a wireless link between a mobile node having said unique address and said node to reduce said routing value associated with said unique address to a lower value than that associated with said unique address by the other nodes in said network.

This allows the amendment of routing tables for the mobile's address to be restricted to an area localised around the location of the mobile node. In other embodiments, packets might be forwarded to nodes having higher routing values for a given address and the creation of the wireless link could result in the provision of a higher routing value than found elsewhere in the network.

Preferably the first routing data is installed prior to the handover of said mobile node. In this way, packets can be routed to the mobile node before handover.

Preferably the second routing data includes data indicating that the second routing data relates to the handover of the mobile node. This ensures that packets are only sent down paths defined by the most recently received routing data.

Preferably the second routing data is installed in response to a routing control message generated at the post-handover access node. Thus even if the link between the mobile node and the pre-handover access node is broken before the link between the post-handover access node and the mobile node is made, the routing can still be updated.

According to a second aspect of the present invention there is provided a packet network including a chain of packet nodes, said chain comprising:
    first and second access nodes for communicating with one or more mobile nodes; and
    one or more intermediate packet nodes providing a path interconnecting said first and second access nodes;
said intermediate packet nodes having installed therein first routing data defining a first routing path in one direction along said chain to a mobile node via said first access node and second routing data defining a second routing path in the other direction along said chain to said mobile node via said second access node
each intermediate packet node being arranged in operation to determine, on receiving a packet destined for said mobile node, whether said packet is from another node on said chain or not and
    a) if the packet is determined to be from a node not on said chain, copying the packet and routing said copy along one of said routing paths and routing said packet along the other of said routing paths; and
    b) if the packet is determined to be from another node on said chain, route said packet along said chain only in the direction in which it is currently travelling.

According to a third aspect of the present invention there is provided a packet node for use in a packet network according to the second aspect of the present invention.

According to a fourth aspect of the present invention there is provided a digital data carrier carrying a program of instructions executable by processing apparatus to perform the method steps as set out in the first aspect of the present invention. The program of instructions are carried on a computer readable medium such as a DVD, CD or a like tangible, physical medium for execution by the processing apparatus.

Further aspects and advantages of the invention will become apparent from embodiments which will now be described, by way of example only, with reference to the accompanying drawings, in which:

FIG. 1 schematically illustrates an example of a fixed/mobile network in accordance with an embodiment of the present invention;

FIG. 2 schematically illustrates a routing protocol data table held in a routing node in accordance with an embodiment of the invention; and FIG. 3 illustrates a next-hop forwarding table held in the routing node in accordance with an embodiment of the invention.

FIGS. 4 to 12 schematically illustrate handover and the accompanying routing updates in accordance with an embodiment of the present invention;

Figure 1:
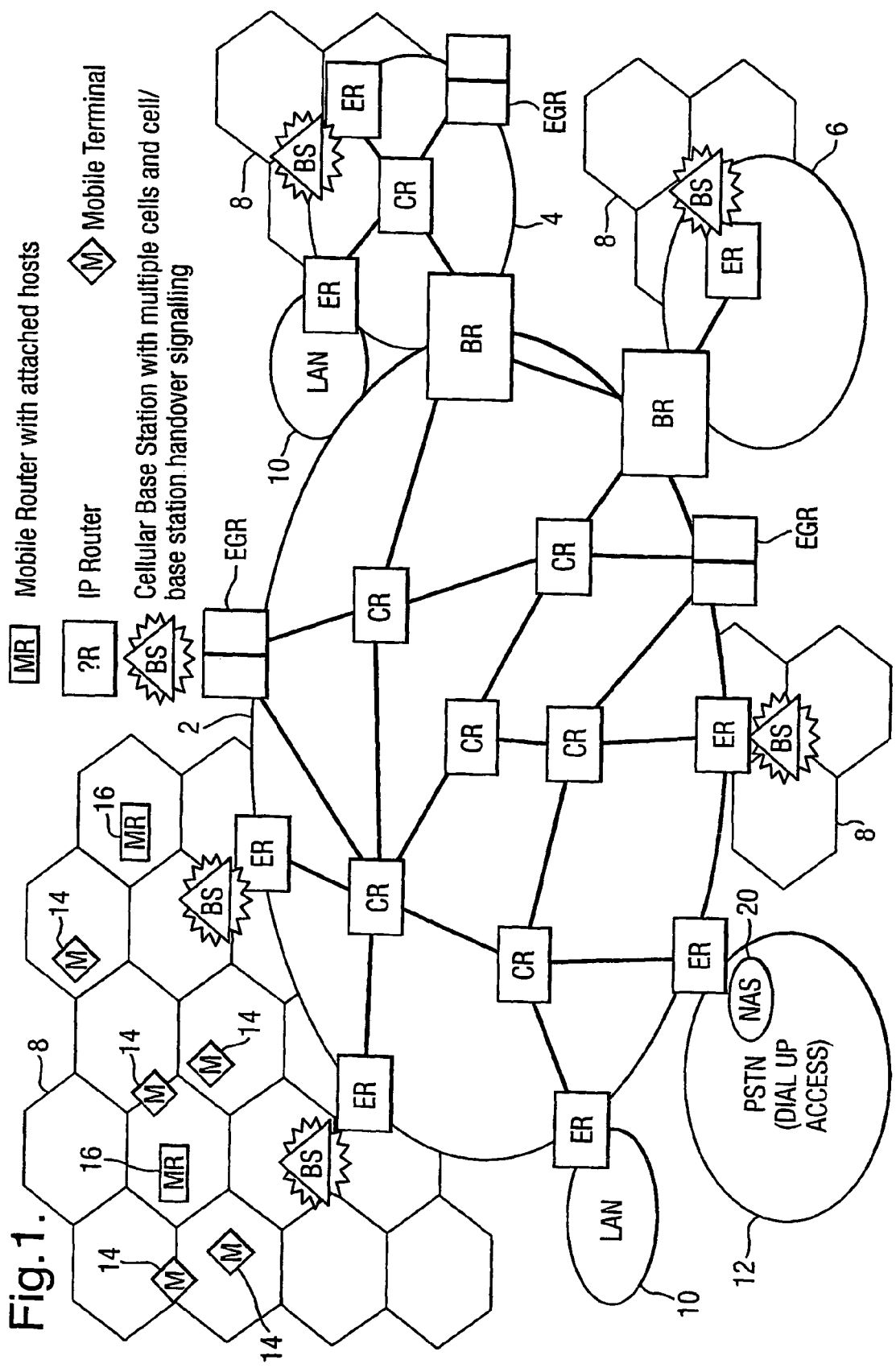

Referring now to FIG. 1, an example of a fixed/mobile topology in accordance with an embodiment of the present invention is shown. The topology includes, by way of example, three packet switching networks 2, 4, 6 forming an Autonomous System (AS). One definition given for the term Autonomous System, is "a set of routers and networks under the same administration" ("Routing in the Internet", Christian Huitema, Prentice-Hall, 1995, page 158). Herein, the term Autonomous System, also referred to as a routing domain in the art, is also intended to mean a network, or a set of networks, having routers running the same routing protocol. An Autonomous System may be connected to other Autonomous Systems forming a global inter-network such as the Internet (used by way of example hereinafter). The routing protocol is an interior gateway protocol, and communications with other Autonomous Systems are achieved via exterior gateway protocols such as the Border Gateway Protocol (BGP). Examples of known interior gateway protocols are the Routing Information Protocol (RIP) and Open Shortest Path First (OSPF).

The networks 2, 4, 6 forming a fixed infrastructure of the Autonomous System include a plurality of Internet Protocol (IP) packet switching nodes in the form of a plurality of Core Routers (CR), a plurality of Edge Routers (ER) and Bridge Routers (BR) interconnecting the different networks 2, 4, 6 in the AS. All of these packet switching nodes run a single IP routing protocol, one embodiment of which is to be described in further detail below.

One or more Exterior Gateway Routers (EGRs) connect the Autonomous System to further Autonomous Systems of the global Internet.

The Autonomous System illustrated in FIG. 1 performs routing for both mobile hosts, for which routing within the AS is altered as a result of mobility of the mobile, and fixed (i.e. stationary) hosts, for which no such routing alterations occur.

Mobile nodes may be connected to an Edge Router via a wireless link, in the example shown, a cellular radio link (a further possible type of wireless link is an infra-red link) using a Base Station (BS) Router provided by a mobile network operator. The cellular radio link may be a Time Division Multiple Access (TDMA) system link, such as found in "Global System for Mobile Communications (GSM)" networks, or a Code Division Multiple Access (CDMA) system link, such as found in "CDMA 2000" networks. Mobile nodes take the form of individual mobile hosts 14, and/or mobile routers 16 having a plurality of hosts attached thereto, each of which conduct radio communication with one or more of the BSs at any given time. A BS may control a number of Base Transceiver Stations (BTSs) which are co-located with radio antennae around which individual "cells" of the cellular system are formed The mobile nodes 14, 16 move between cells of the cellular radio communications network. If a BS serves a number of cells, a mobile node handed over between cells may continue to receive packet data via the same BS. However, once a mobile node moves outside the range of a BS via which it is receiving service, handing over to a new cell may necessitate a change of routing within the AS. Data packets originating from and destined to the mobile node in question, are routed, using the IP address of the node, via a given BS prior to handover. Following handover, these data packets may require routing, for the same IP address, via a different BS. A mobile node may be participating in a communications session with a different host via the AS during handover from one BS to another. Because connections at the transport layer (in, for example, a transmission control protocol/internet protocol (TCP/IP) connection) are defined in part by the IP address of the mobile node, such a change in routing is desired to allow such connections to continue using the same IP address when a mobile node receives service from a different BS.

Fixed hosts may be connected to an Edge Router via a Local Area Network (LAN) 10, running a local area network protocol such as an Ethernet protocol. Fixed hosts may also be connected to an Edge Router via a Public Switched Telephone Network (PSTN) 12 using a Network Access Server (NAS) 20 provided by an Internet access provider. The NAS 20 dynamically allocates fixed IP addresses on a dial-up basis to fixed hosts connecting to the NAS 20 using a protocol such as "Point to Point (PPP)" or "Serial Line Interface Protocol (SLIP)", and routes IP packets originating from, or destined to, each fixed host via an associated Edge Router. Whilst the NAS 20 allocates IP addresses on a dynamic basis, the Edge Router via which packets are routed for the allocated IP address does not change, either during an access session or over a longer-term period. Thus, routing within the Autonomous System does not need to change for each of the fixed hosts other than because of factors internal to the AS such as link failure or traffic management.

The interior gateway protocol, the single IP routing protocol used in the AS in this embodiment of the present invention is a modified version of the Temporally-Ordered Routing Algorithm (TORA) routing protocol, which is described in, inter alia, "A Highly Adaptive Distributed Routing Algorithm for Mobile Wireless Networks" Vincent D Park and M Scott Corson, Proceedings of INFOCOM '97, April 7-11, Kobe, Japan; and "A Performance Comparison of the Temporally-Ordered Routing Algorithm and Ideal Link-State Routing" Vincent D Park and M Scott Corson, Proceedings of ISCC '98, 30 Jun.-2 Jul., 1999, Athens, Greece.

The TORA routing protocol algorithm executes distributedly, provides loop-free routes, provides multiple routing (to alleviate congestion), establishes routes quickly (so they may be used before the topology changes), and minimises communication overhead by localising algorithmic reaction to topological changes when possible (to conserve available bandwidth and increase scalability).

The algorithm is distributed in that nodes need only maintain information about adjacent nodes (i.e. one hop knowledge). It ensures all routes are loop-free, and typically provides multi-path routing for any source/destination pair which requires a route or a plurality of routes. Since multiple routes are typically established, many topological changes do not require routing updates within the AS since having a single route is sufficient. Following topological changes which do require routing updates, the protocol reestablishes valid routes.

The TORA protocol models a network as a graph G=(N, L), where N is a finite set of nodes and L is a set of initially undirected links. Each node i∈N has a unique node identifier (ID), and each link (i, j)∈L allows two-way communication (i.e. nodes i and j, which are connected by a link, can communicate with each other in either direction). Each initially undirected link (i, j)∈L may subsequently be assigned one of three states; (1) undirected, (2) directed from node i to node j, or (3) directed from node j to node i. If a link (i, j)∈L is directed from node i to node j, node i is said to be "upstream" from node j while node j is said to be "downstream" from node i. For each node i, the "neighbours" of i, $N_i$∈N, are defined to be the set of nodes j such that (i, j)∈L. Each node i is always aware of its neighbours in the set $N_i$.

A logically separate version of the protocol is run for each destination (identified by a host IP address for example) to which routing is required.

The TORA protocol can be separated into three basic functions: creating routes, maintaining routes, and erasing routes. Creating a route from a given node to the destination requires establishment of a sequence of directed links leading from the node to the destination. Creating routes essentially corresponds to assigning directions to links in an undirected network or portion of the network. The method used to accomplish this is a query/reply process which builds a directed acyclic graph (DAG) rooted at the destination (i.e. the destination is the only node with no downstream links). Such a DAG may be referred to as a "destination-oriented" DAG. Maintaining routes involves reacting to topological changes in the network in a manner such that routes to the destination are re-established. Upon detection of a network partition (i.e. when a network has been split into multiple parts), all links (in the part of the network which has become partitioned from the destination) are marked undirected to erase invalid routes.

The protocol accomplishes these three functions through the use of three distinct control packets: query (QRY), update (UPD), and clear (CLR). QRY packets are used for creating routes, UPD packets are used for both creating and maintaining routes, and CLR packets are used for erasing routes.

At any given time, an ordered quintuple, referred to as a "height", $H_i=(\tau_i, oid_i, r_i, \delta_i, i)$ is associated with each node i∈N. Conceptually, the quintuple associated with each node represents the height of the node as defined by two parameters: a reference level and a delta with respect to the reference level. The reference level is represented by the first three values in the quintuple while the delta is represented by the last two values. A new reference level is defined each time a node loses its last downstream link due to a link failure. The first value representing the reference level, $\tau_i$, is a time tag set to the "time" of the link failure. The second value, $oid_i$, is the originator-ID (i.e. the unique ID of the node which defined the new reference level). This ensures that the reference levels can be totally ordered lexicographically. The third value, $r_i$, is a single bit used to divide each of the unique reference levels into two unique sub-levels. This bit is used to distinguish between the original reference level and its corresponding, higher reflected reference level. The first value representing the delta, $\delta_i$, is an integer used to order nodes with respect to a common reference level. This value is instrumental in the propagation of a reference level. Finally, the second value representing the delta i, is the unique ID of the node itself. This ensures that nodes with a common reference level and equal values of $\delta_i$ (and in fact all nodes) can be totally ordered lexicographically at all times.

Each node i (other than the destination) maintains its height, $H_i$. Initially the height of each node in the network (other than the destination) is set to NULL, $H_i=(-, -, -, -, i)$. Subsequently, the height of each node i can be modified in accordance with the rules of the protocol. In addition to its own height, each node i maintains, in a routing protocol data table, entries against host IP addresses having an existing DAG in the network, the entries including a height array with an entry $HN_{ij}$, for each neighbour $j \in N_i$.

Each node i (other than the destination) also maintains, in the routing protocol data table, a link-state array with an entry $LS_{ij}$ for each link $(i, j) \in L$. The state of the links is determined by the heights $H_i$ and $HN_{ij}$ and is directed from the higher node to the lower node. If a neighbour j is higher than node i, the link is marked upstream. If a neighbour j is lower than node i, the link is marked downstream.

The TORA protocol was originally designed for use in a Mobile Ad-Hoc Network (MANET) in which the routers are mobile and are interlinked via wireless links. However, in this embodiment of the invention a modified TORA protocol is used in an Autonomous System including a fixed infrastructure of fixed routers interconnected by fixed links, such as that illustrated in FIG. 1, to provide for routing alterations in the fixed infrastructure when a mobile host alters its point of attachment to the infrastructure.

FIG. 2 illustrates schematically an example of a routing protocol data table which may be held in a router in accordance with this embodiment.

Against each host IP address (or address prefix in the case of an aggregated DAG, to be described in further detail below) IP1, IP2, etc having a DAG in the network is stored the primary height of the storing node $H_i(IP1)$, $H_i(IP2)$, etc. Also, the identity of each adjacent neighbour for example w, x, y, z and that neighbour's primary height $HN_{iw}(IP1, IP2, etc)$, $HN_{ix}(IP1, IP2, etc)$, $HN_{iy}(IP1, IP2, etc)$ and $HN_{iz}(IP1, IP2, etc)$. Also the link-state array for each IP address (or prefix) may be stored in the form of markings signifying an upstream link (U), a downstream link (D), or an undirected link (–) against each primary link identity (L1, L2, L3, L4) corresponding to each neighbour. For each adjacent neighbour w, x, y, z, that neighbour's secondary height $HN_{iw}:S(IP1, IP2, etc)$, $HN_{ix}:S(IP1, IP2, etc)$, $HN_{iy}:S(IP1, IP2, etc)$ and $HN_{iz}:S(IP1, IP2, etc)$ is further stored. Finally the secondary link-state array for each IP address (or prefix) may be stored in the form of markings signifying an upstream link (U), a downstream link (D), or an undirected link (–) against each secondary link identity (L1:S, L2:S, L3:S, L4:S) corresponding to each neighbour.

The link-state array held in the routing protocol data table allows a next-hop forwarding decision to be made locally in the router holding the data. For a sufficiently interconnected network, each router should have at least one downstream link. If only one downstream link exists, that link is selected as the next-hop forwarding link. If more than one downstream link exists, an optimum downstream link may be selected, for example on the basis of current traffic loading on the two links. In any case, the selected link is entered into a next-hop forwarding data table against the IP address. A next-hop forwarding table, such as that illustrated in FIG. 3, is held in cache memory for fast access as IP packets requiring routing arrive at the router. The table stores the primary next-hop forwarding link (L2, L1, etc) selected and the secondary next-hop forwarding link (L1:S, L2:S, etc) selected, against each IP address (or prefix) IP1, IP2, etc.

The use of a fixed infrastructure of routers, and other aspects of the invention to be described below, allow for routing aggregation within the AS, in particular for the IP addresses of mobile hosts. What follows is a brief description of IP addressing, in particular how variable length prefixes are used to provide routing aggregation in an IP routing network.

IP addresses currently consist of a predetermined number (32) of bits. IP addresses were in the past allocated on an unstructured basis (referred to as a "flat" addressing plan). Classful addressing introduced the concept of a two level routing hierarchy by splitting addresses into network prefix and host fields. Users were allocated IP addresses as either a class A, class B or class C to simplify routing and administration.

In class A, bit 0 identifies class A, bits 1-7 identify network (126 networks) and bits 8-31 identify host (16 million hosts).

In class B, bits 0-1 identify class B, bits 2-15 identify network (16,382 networks) and bits 16-31 identify host (64,000 hosts).

In class C bits 0-2 identify class C, bits 3-23 identify network (2,097,152 networks) and bits 24-31 identify host (256 hosts).

A two-level hierarchy still left a flat routing hierarchy between hosts within a network. For example, a class A address block could have 16 million hosts which would result in all routers within the network containing 16 million routing table entries. Subnetting was developed to allow a host address block to be split into a variable length subnet field and host field. This allows routers within an AS to keep routing table entries for subnets only (providing the aggregation of routing for all the hosts on each subnet). A subnet mask is used to enable routers to identify the subnet part of the address.

In accordance with this embodiment of the invention, routing aggregation is provided by assigning a host IP address block (i.e. a contiguous sequence of IP addresses sharing one or more prefixes) to a BS, and dynamically allocating IP addresses from within the block to mobile hosts for the duration of their access sessions. When a mobile host registers with the cellular network on power up, the serving BS allocates an IP address and caches a binding between the mobile host's wireless link identifier and the allocated IP address. An aggregated routing plan (in this embodiment an aggregated DAG) is pre-computed within the AS before the mobile host is allocated the IP address it uses throughout its access session. Following power down of the mobile host, the IP address is returned to the owning BS, which may then allocate the IP address to another mobile host. Mobile host IP addresses allocated by a BS will have an aggregated DAG, until at least one of the mobile hosts moves away, in which case the aggregated DAG will remain in place, but a host-specific exception will be created on the routers affected by a mobility-specific routing updating procedure (the update only changes routing for the single mobile which has moved away).

Pre-computation of routes in an AS for address prefixes owned by a BS is achieved by the owning BS injecting an update message, referred to herein as an "optimisation" (OPT) packet, for each prefix, which update message floods out across the AS and effectively acts as a prefix announcement as well as building the aggregated DAG. The OPT packet is transmitted by the BS owning the IP address prefix, or prefixes, and controlling the aggregated DAG. The OPT packet is propagated to all other nodes in the network (regardless of their current heights (if set)), (re)setting these heights to the "all-zero" reference level, that is to say the first three values $(T_i, oid_i, r_i)$ of the TORA heights are all set to zero. The fourth height value, $\delta_i$, is set to the number of hops taken by the OPT packet since transmission from the BS (this is similar to UPD packet propagation in known TORA source-initiated DAG creation mechanisms). An increment of 1 may be added to represent the hop from the BS to the mobile host. The fifth height value, i, is set to the packet switching node ID.

Once an aggregated DAG exists in the AS, each packet switching node in the AS has a next-hop forwarding table entry for the IP address prefix in question. When a packet arrives at a node which requires routing, the node searches its next-hop forwarding table for the longest matching address entry on which to base the next routing decision, which, providing the mobile host using the IP address has not moved away from the owning BS, will be the IP address prefix. By providing for aggregated DAGs within the AS, routing table size and routing processing may be minimised at each packet switching node.

However, when a mobile host is handed over at the wireless link layer away from the BS at which it first received service in the network, an individual host address entry is created in both the routing protocol data table and the next-hop forwarding table in (a limited number of) packet switching nodes affected by routing updates caused by the mobility of the mobile node. These nodes continue to store the corresponding aggregated address entries, but use the host address entry for routing packets to the IP address of the mobile host by virtue of a longest match search.

The TORA height maintenance algorithm falls into the same general class of algorithms originally defined in "Distributed Algorithms for Generating Loop-Free Routes in Networks with Frequently Changing Topology", E Gafni and D Bertsekas, IEEE Trans. Commun., January 1991. Within this class, a node may only "increase" its height; it may never decrease its height. However, in this embodiment of the invention, an algorithmic modification is provided to ensure that, after a handover, a node's forwarding behaviour is such that, when a plurality of routing interfaces to neighbouring nodes exist, it forwards packets over a routing interface to a neighbouring node from which a mobility-related routing update was most recently received. The c time value in the height quintuple ($\tau_i$, $oid_i$, $r_i$, $\delta_i$, i) stored in the router's routing protocol data table as an entry against the mobile node's IP address and the neighbour in question is permitted to become "negative", i.e. less than zero, to indicate a mobility-related update having occurred, and the magnitude of the negative $\tau$ time value increases for each occurrence of a mobility-related routing update for a given IP address. Thus, the most recent mobility-related update is indicated by the more negative $\tau$ time value. It is to be noted, that whilst mobility-related routing updates are distinguished by a negative $\tau$ time value, other indicators may also be used, such as a one-bit flag, to replace the negative flag.

When a mobile host changes BS affiliation, it decreases its height value by decreasing the $\tau$ time value, for example by an integer, and the new value is propagated to a limited number of nodes in the AS as part of a mobile-initiated update of the DAG associated with the mobile node's IP address, to be described in further detail below. A node having multiple downstream neighbours routes onto the most recently-activated downstream link. The heights are still totally-ordered (hence routing loop freedom is preserved).

A detailed example of handover and routing updates within the fixed infrastructure of an AS will now be described with reference to FIGS. 4 to 12. In each of the TORA height quintuples illustrated in FIGS. 4 to 12, the packet switching node ID is depicted using the reference i, for simplicity. However, it will be appreciated that this value will be different for each packet switching node, so as to uniquely identify the packet switching node within the AS. It will also be noted that only a part of the AS is illustrated, for the sake of simplicity.

In all of the following examples, the AS includes a plurality of fixed core routers (CR1, CR2 . . . ), a plurality of fixed intermediate routers (IR1, IR2 . . . ), a plurality of fixed edge routers (ER1, ER2 . . . ) and a plurality of base station (BS1, BS2 . . . ), classified in accordance with their relative proximity to the topological "edge" of the fixed infrastructure. The core routers may be adapted to handle higher quantities of traffic than the intermediate routers, and the intermediate routers, in turn, may be adapted to handle higher quantities of traffic than the edge routers. For example, the core routers may handle national traffic, the intermediate routers regional traffic, and the edge routers sub-regional traffic.

In the case of all of the examples described below, the hop-by-hop routing directionality at the interfaces is indicated by arrows marked along links between nodes of the network, and between access nodes and mobile nodes (which links include a wireless link). The distributed routing plan is in the form of a TORA DAG directed at a single receiving mobile host, MH2. Before the mobile host MH2 begins an access session, and is dynamically allocated an IP address, a pre-computed and aggregated DAG exists for the IP address within the AS, having been injected as an AS-wide update from the access node allocating the IP address, node BS2. In FIGS. 4 to 17, nodes involved in routing updates or packet forwarding are marked with their TORA height quintuple ($\tau_i$, $oid_i$, $r_i$, $\delta_i$, i). As previously described, this TORA height is also stored within the routing protocol data table of each neighbouring node, having been advertised to each neighbouring node from the node to which the height applies.

When the mobile host MH2 registers with the home access node BS2, the home access node BS2 caches the identity of the mobile host MH2 at the wireless link layer against the IP address which is allocated, thus forming a mobile-specific entry in a routing table held in BS2.

Figure 4:
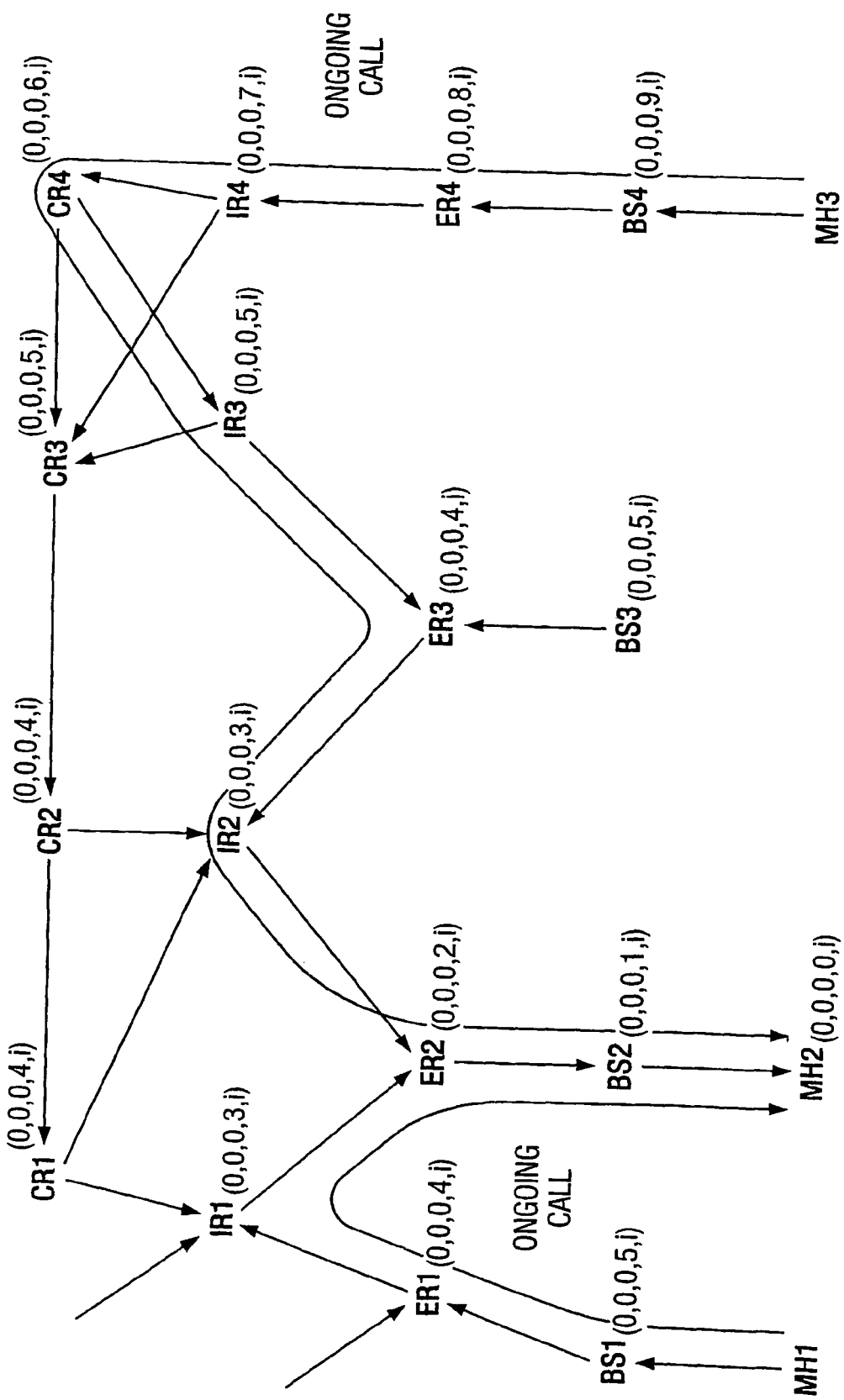

FIG. 4 illustrates a communications session occurring between the mobile host MH2 and two further hosts, MH1 and MH3. In the following examples, mobility of the correspondent mobile hosts MH1 and MH3 does not occur, although such mobility is possible using the same functionality which is to be described in relation to the mobility of MH2. A similar communications session may also be conducted with a correspondent fixed host. Notably, a separate DAG exists within the AS directed towards MH1 and MH3, whereby data packets originating from MH2 are routed to MH1 and MH3. As this DAG directed to MH1 and MH3 does not alter, and routing exists towards MH1 and MH3 from each access node which MH2 affiliates with, no further description of routing towards MH1 and MH3 will be provided.

Data packets originating from MH1 and MH3 and destined for MH2 are initially routed to the home access node BS2 via its aggregated DAG, for example via fixed nodes BS1, ER1, IR1, and ER2 for MH1 and BS4, ER4, IR4, CR4, IR3 and ER3 for MH3, as shown in FIG. 4.

Figure 5:
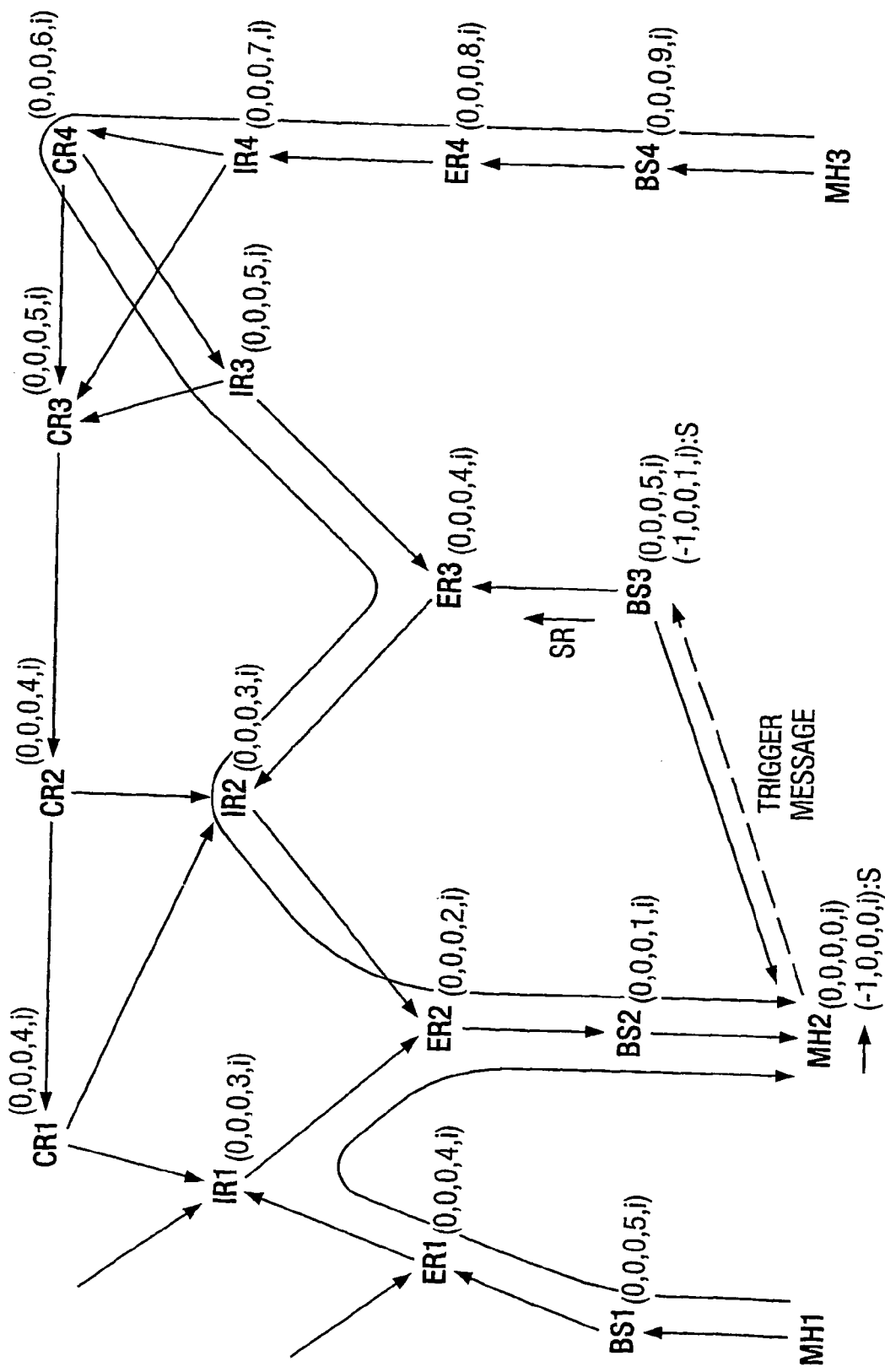

Referring now to FIG. 5, a handover decision may be made either by the mobile host MH2 itself, or by the node BS2. In the case of a mobile node-initiated handover, the decision may be made based on a comparison of wireless link quality between signals received from the access nodes BS2 and BS3. As MH2 moves, the signal received from access node BS3 may improve, whilst the signal received from access node BS2 worsens, and at a threshold decision event, MH2 responds by initiating a handover between nodes BS2 and BS3. In the case of a handover decision made at node BS2, the decision may be made based on other considerations, such as traffic load. In such a case, the access node BS2 transmits a handover instruction to MH2.

Whether the handover is initiated by the mobile host MH2 or the home access node BS2, the mobile host MH2 computes a new, secondary height of (−1,0,0,0,i):S. The ":S" indicates that this height is secondary. The fact that this height is secondary indicates that the old access node BS2 maintains control of the DAG for the IP address it originally allocated to MH2. The negative value, −1, of the $\tau$ time value indicates a first mobility related routing update away from the home access node BS2. The new secondary height is then transmitted as part of a trigger message to the new access node BS3. The trigger message informs the new access node BS3 that control of the DAG for the IP address originally allocated to MH2 could be passed to it.

Figure 18:
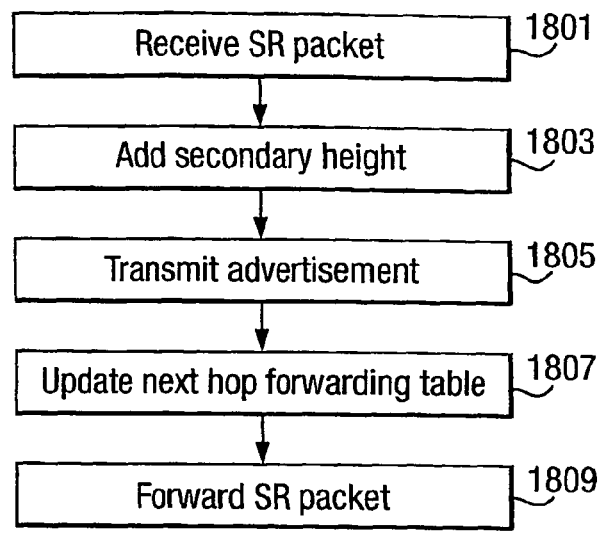
FIGS. 18 to 21 are flow charts illustrating how a node reacts to receiving different types of packet.

Upon receiving the trigger message, the new access node BS3 interprets the trigger message as an instruction to generate a unicast directed Secondary Request (SR) packet. The SR packet is similar to an OPT packet and is processed and forwarded by the neighbouring routers. The SR packet is to travel along a unicast path between the new access node BS3 and the home access node BS2. What a node does in response to it receiving an SR packet will now be described with reference to FIG. 18. After receiving an SR packet (step 1801) the node adds an additional, secondary height into its routing protocol data table (step 1803).

These secondary heights also have a negative X time value associated with the mobility update. Furthermore, the δ value of the secondary height quintuple represents the number of hops to the mobile host MH2 via the new access node BS3.

The node then transmits an advertisement of its new secondary height to each of its neighbouring node (step 1805), the propagation of these advertisements being limited to one hop. Each neighbouring node can therefore update its routing protocol data table with the new secondary height. If necessary, the node then updates its next hop forwarding table (step 1807) which, it will be remembered, is held in its cache memory. Finally, the node forwards the SR packet.

It will be realised that once a node has updated its routing protocol data table and next hop forwarding table to include secondary height information, it will have for each of one or more IP addresses, two downstream links (a primary one and a secondary one) and therefore two entries in its next hop forwarding table.

Figure 19:
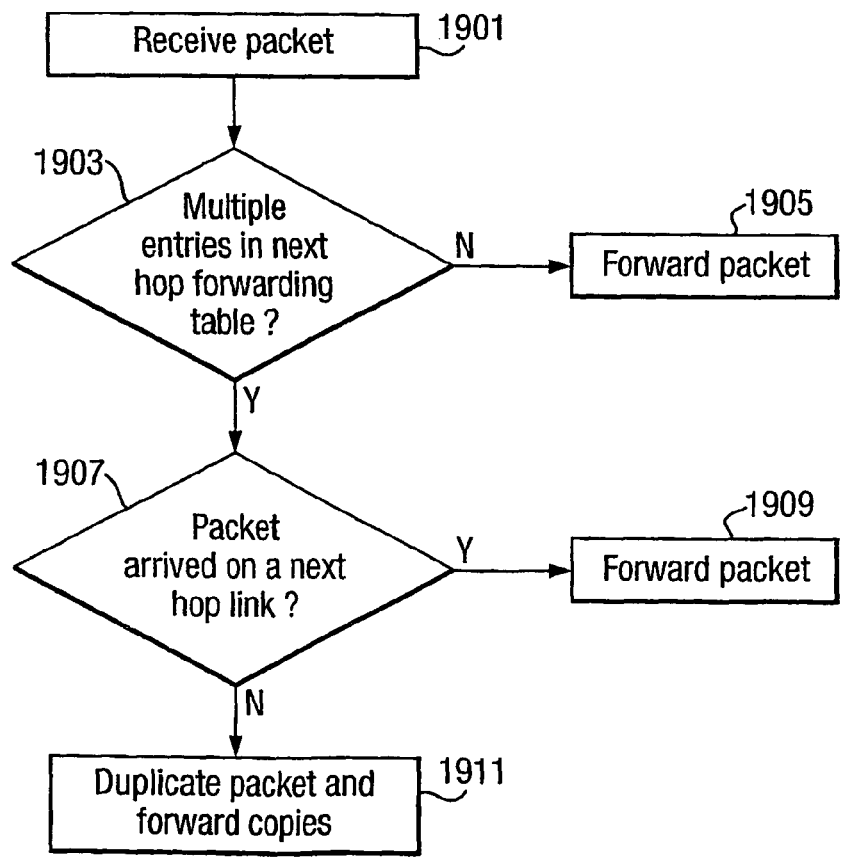

Referring to FIG. 19, upon receiving packets (step 1901), therefore, nodes will check (step 1903) their next hop forwarding table for multiple entries. If there is only one downstream link from that node and therefore only one entry in the next hop forwarding table then the packet will be forwarded down this link (step 1905). If, however, there is more than one downstream link from that node and therefore multiple entries in the next hop forwarding table then the node performs a further check (step 1907) to see if the packet arrived at the node down one of the links found in its next hop forwarding table. If the packet did arrive via one of the indicated downstream links then it is not forwarded down this link and is rather only forwarded down the other links found in the next hop forwarding table (step 1909). This avoids the node merely reflecting a packet back down the link on which it arrived. If, however, the packet was not received from one of these links then it is copied and a copy is forwarded down all the links found in the next hop forwarding table (step 1911).

Referring once again to FIG. 5, new access node BS3 adds a secondary height of (−1,0,0,1,i):S to its routing protocol data table, transmits an advertisement of this new secondary height to its neighbours (i.e. node ER3), updates its next hop forwarding table and forwards the SR packet to node ER3.

Figure 6:
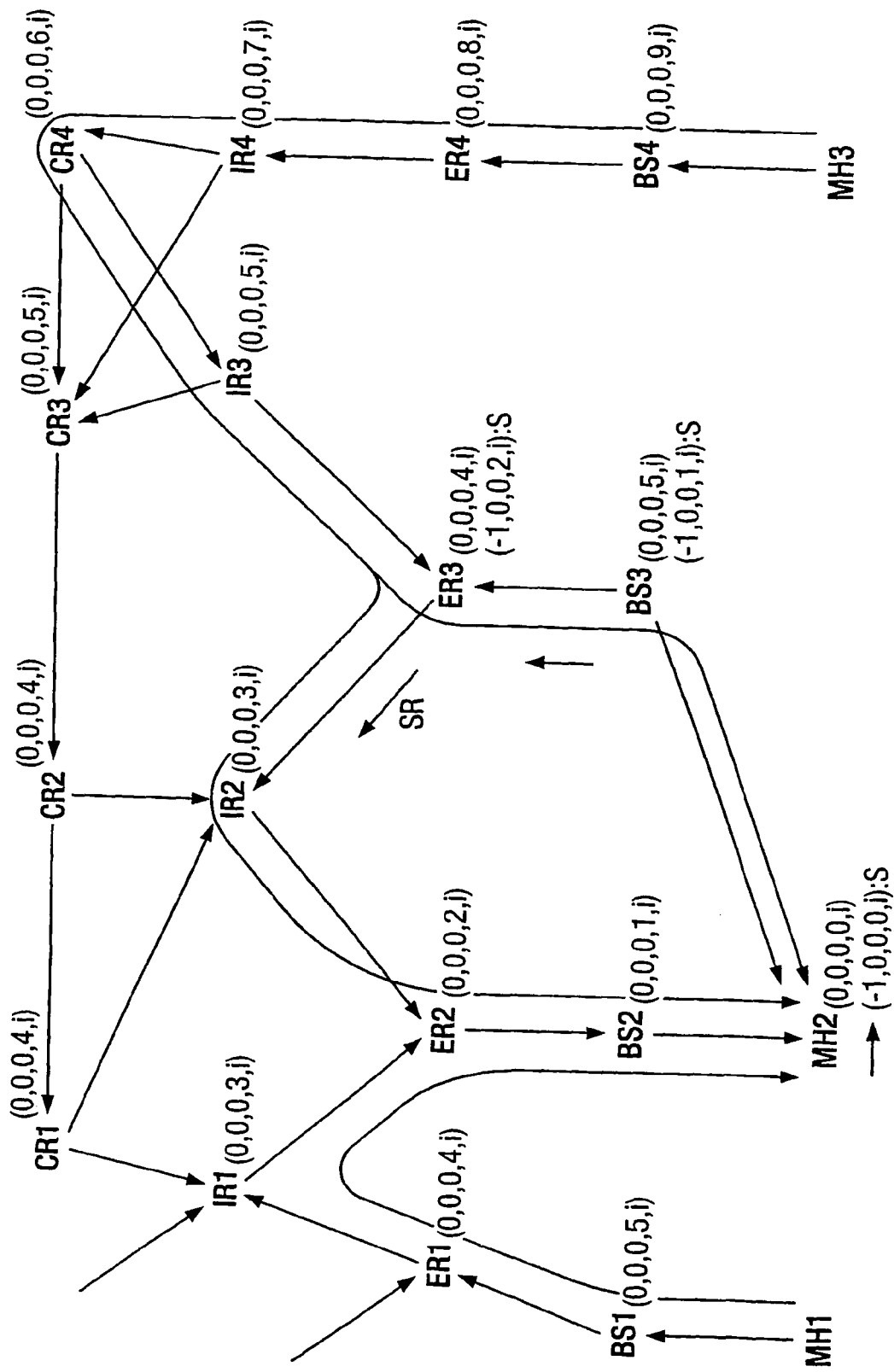

Referring now to FIG. 6, node ER3 in turn adds a secondary height of (−1,0,0,2,i):S to its routing protocol data table, transmits an advertisement of this new secondary height to its neighbours (i.e. nodes IR2, IR3 and BS3), updates its next hop forwarding table and forwards the SR packet to node IR2. It will be realised that despite node ER3 having two downstream links (a primary one directed towards node IR2 and a secondary one directed towards node BS3) and therefore two entries in its next hop forwarding table, the SR packet was received from node BS3 and therefore the packet is not sent back down this link.

Node ER3 is, however, the router which provides the branching point between the routing path followed from the transmitting mobile host MH3 to the home access node BS2 and the routing path to be followed by packets transmitted from mobile host MH3 to the new access node BS3 (the routing path being established). Data packets arriving at node ER3 from node IR3 and directed to the mobile host MH2 are copied and a copy is forwarded to node IR2 along the primary link and another copy is also forwarded to node BS3 along the secondary link.

Figure 7:
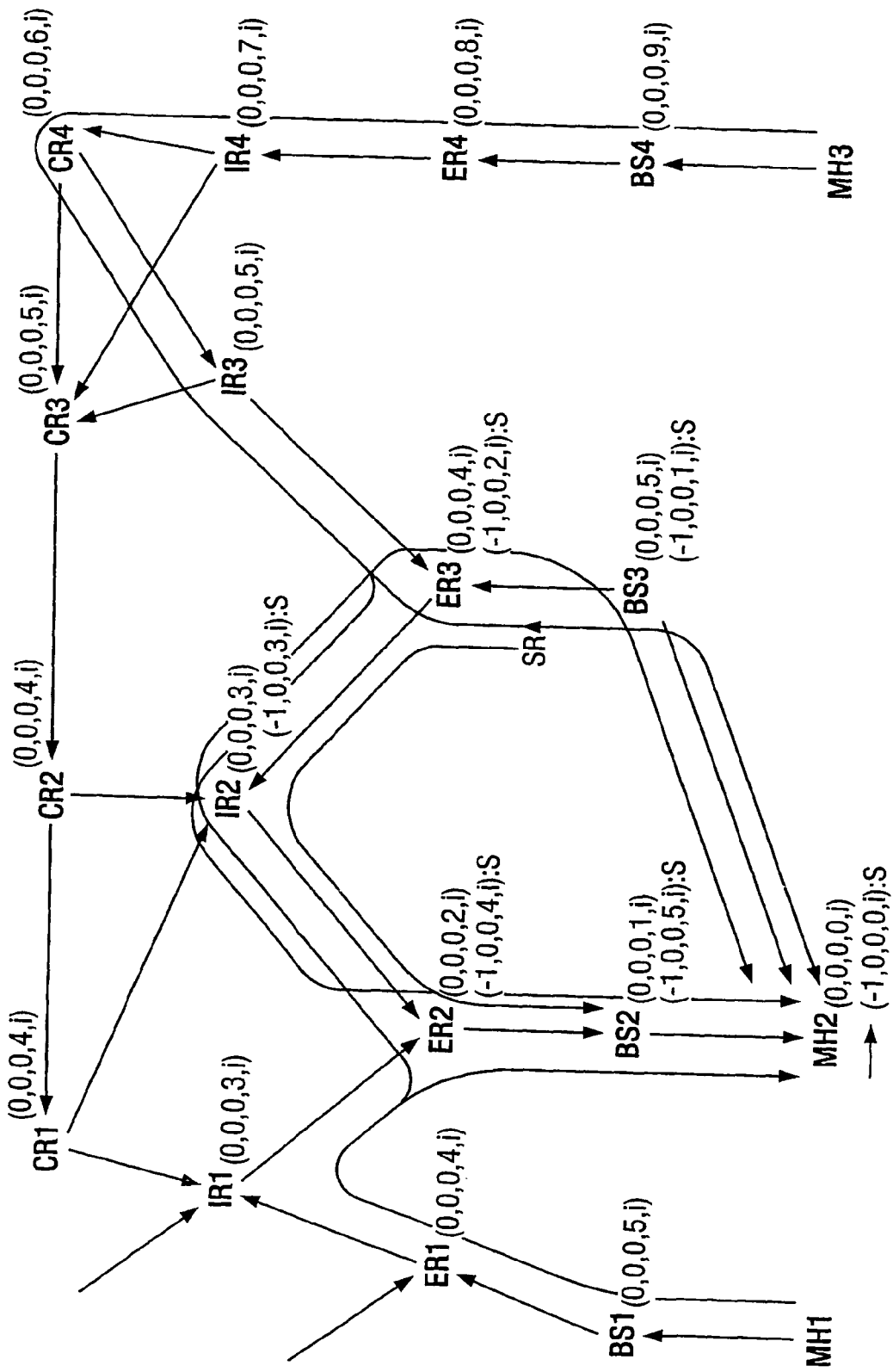

Referring to FIG. 7, upon receiving the SR packet, node IR2 adds a secondary height of (−1,0,0,3,i):S to its routing protocol data table, transmits an advertisement of this new secondary height to its neighbours (i.e. nodes CR1, CR2, ER2 and ER3), updates its next hop forwarding table and forwards the SR packet to only node ER2. It will be realised that despite node ER2 having two downstream links (a primary one directed towards node BS2 and a secondary one directed towards node IR2), the SR packet was received from node IR2 and therefore the packet is not sent back down this link.

Node ER2 is, however, the router which provides the branching point between the routing path followed from the transmitting mobile host MH1 to the home access node BS2 and the routing path to be followed by packets transmitted from the mobile host MH1 to the new access node BS3. Data packets arriving at node ER2 from node IR1 and directed to the mobile host MH2 are copied and a copy is forwarded to node BS2 along the primary link and another copy is forwarded to node IR2 along the secondary link.

Figure 8:
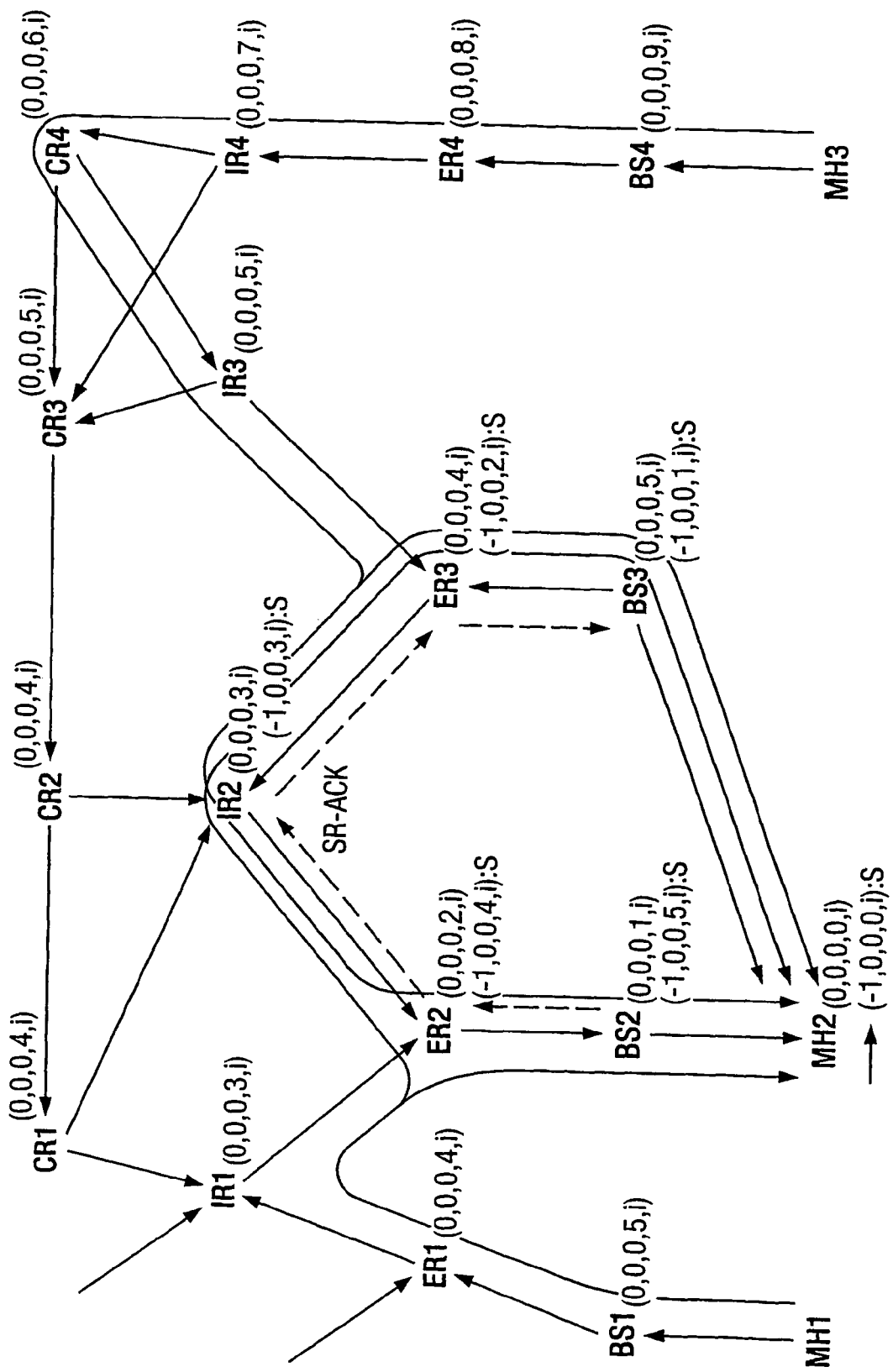

Referring to FIG. 8, on receipt of the SR packet, the home access node BS2 may transmit a SR-acknowledgement (SR-ACK) towards the new access node BS3. The SR-ACK packet follows the secondary path established in the DAG towards the new access node BS3. Once the secondary DAG has been established, data packets directed towards the mobile host MH2 are forwarded to MH2 via the new secondary link from new access node BS3, in addition to data arriving at the mobile via the old primary link through home access node BS2.

Subsequently, when the new link is preferred or the old link is lost, the mobile host MH2 sends a message to the new access node BS3 indicating the loss of the connection to the old access node BS2. Since the old primary connection is lost, the old primary height associated with MH2 is lost too. MH2 therefore assumes its secondary height as its new height and includes it in the message. Handoff is triggered by the new access node BS3 interpreting the message as an instruction to generate a unicast-directed update-secondary (UUPD-S) packet.

Figure 20:
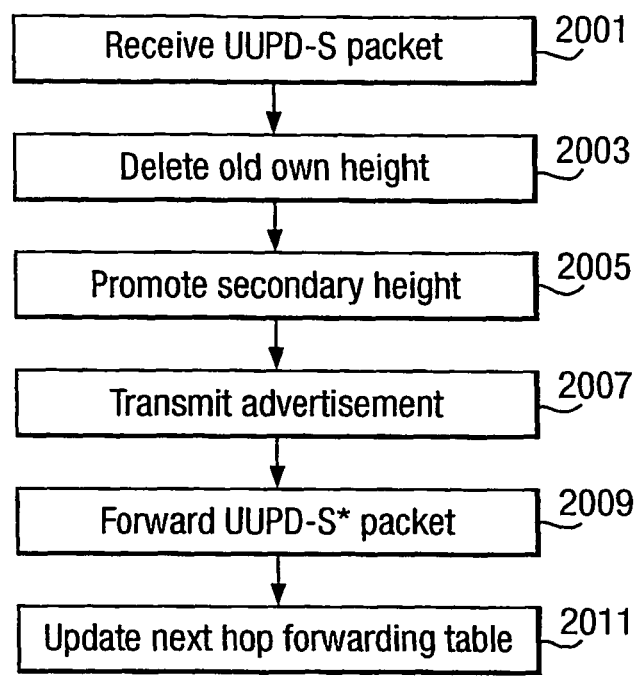

The UUPD-S packet is similar to an OPT packet and is processed and forwarded by the neighbouring nodes. The UUPD-S packet is to travel along a unicast path between the new access node BS3 and the home access node BS2 updating the routing. The process for what a node does in response to it receiving a UUPD-S packet will now be described with reference to FIG. 20.

After receiving a UUPD-S packet (step 2001), the node deletes its old primary height entry from its routing protocol data table (step 2003), promotes its secondary height entry (step 2005) by removing the ":S" suffix and transmits an advertisement of its new height to each of its neighbouring nodes (step 2007), the propagation of these advertisements being limited to one-hop. Each neighbouring node can therefore update its own routing protocol data table. The node then forwards the UUPD-S packet (step 2009) and finally updates its next hop forwarding table to reflect the new heights.

Figure 9:
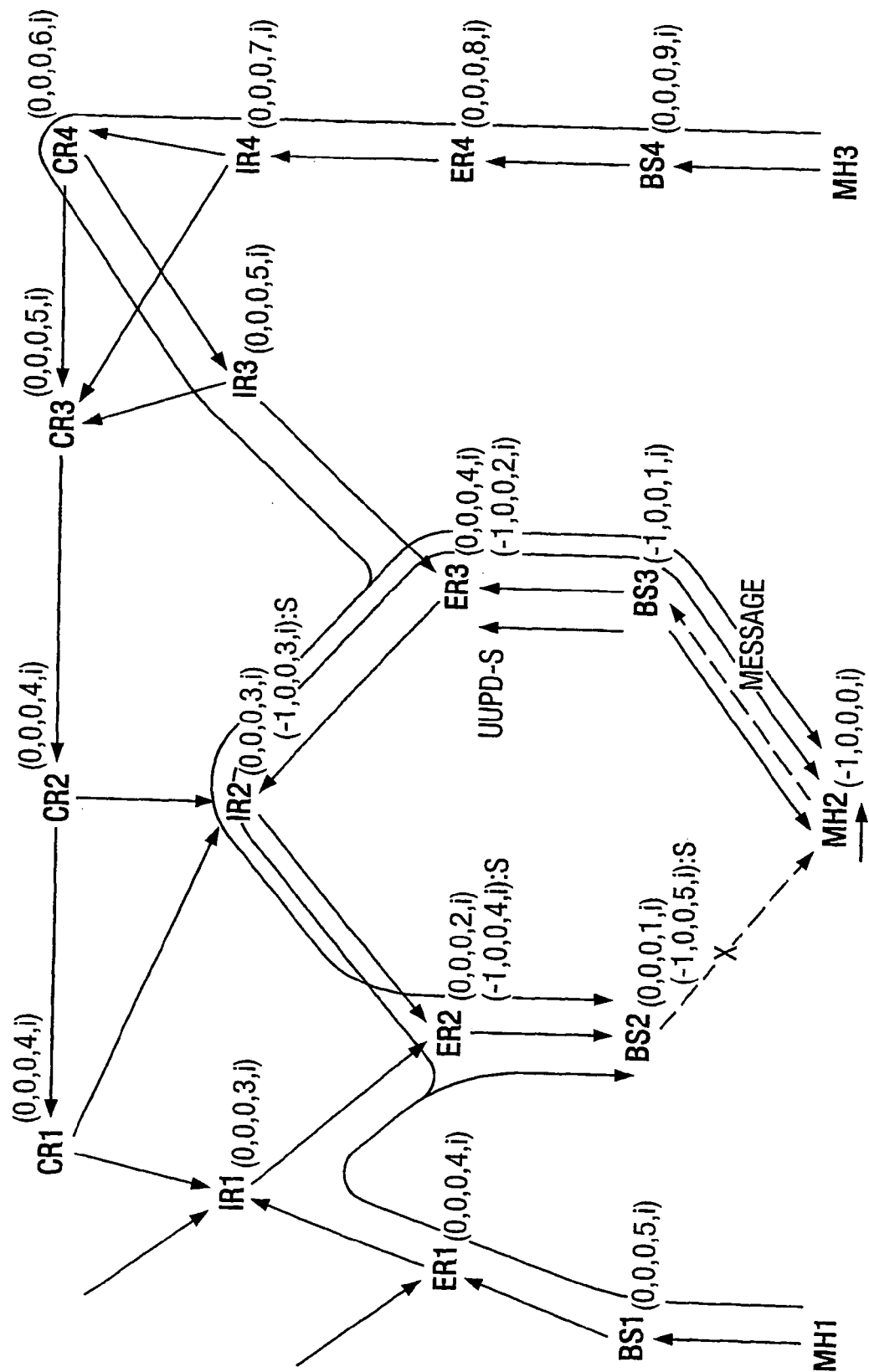

Referring to FIG. 9, having received a message from the mobile host MH2, the new access node BS3 generates a UUPD-S packet. The packet causes the deletion of the old height entries and the promotion of the secondary height entries (by removing the ":S" suffix) in its routing protocol data table. Access node BS3 then transmits an advertisement of its new height to its neighbours (i.e. node ER3) and then forwards the UUPD-S packet to node ER3. Finally access node BS3 updates its next hop forwarding table to reflect the fact that it now only has one downstream link, that towards the mobile host MH2.

Figure 10:
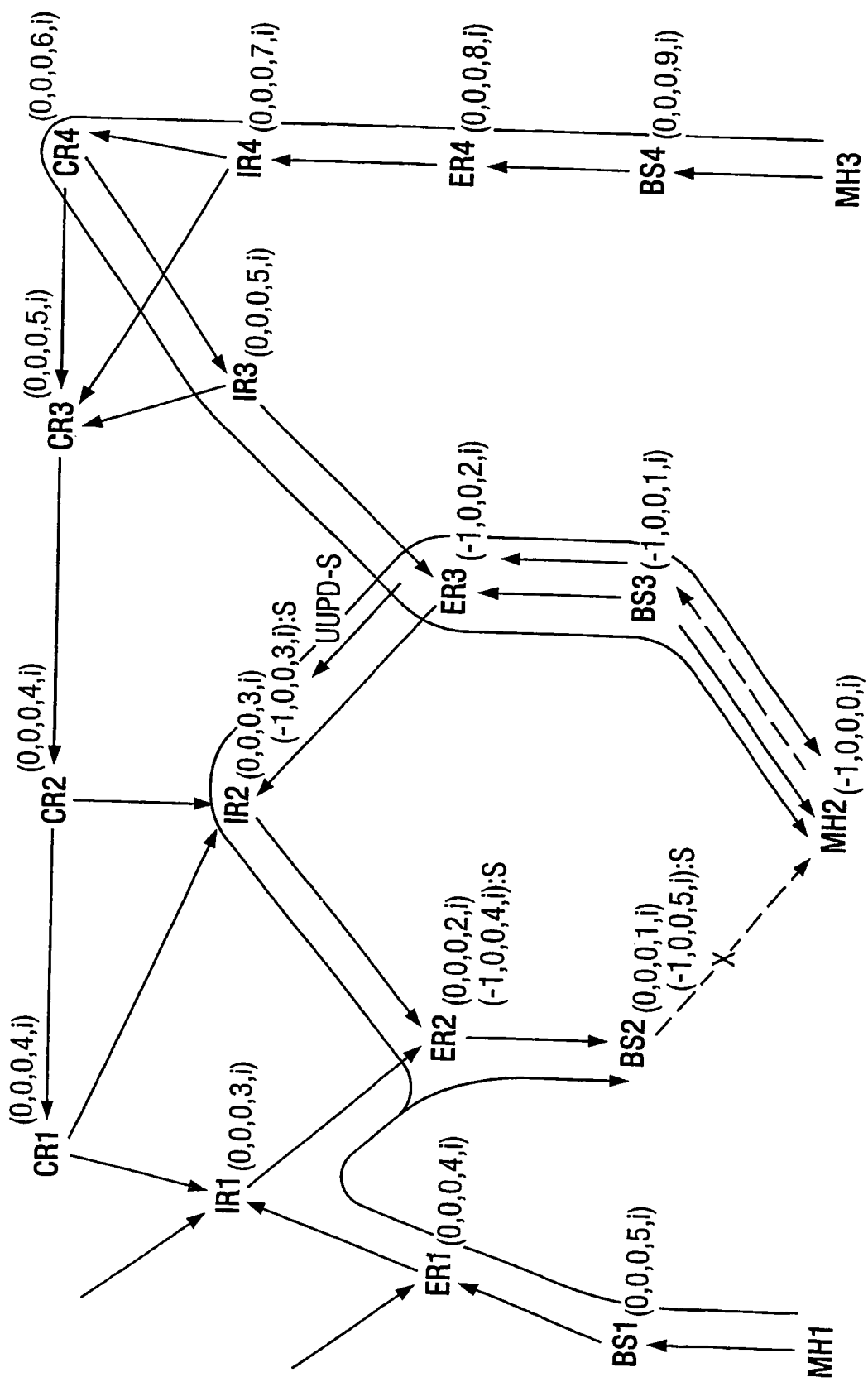

Referring now to FIG. 10, it will be remembered that node ER3 is a branching node. Once the UUPD-S packet has passed through node ER3 (and therefore once its routing protocol data table and next hop forwarding table has been updated) node ER3 only has one downstream link, that directed towards the new access node BS3. Therefore, packet duplication at node ER3 ceases at this time. The UUPD-S is forwarded to the subsequent node along the unicast updating route, node IR2 and then to node ER2.

Figure 11:
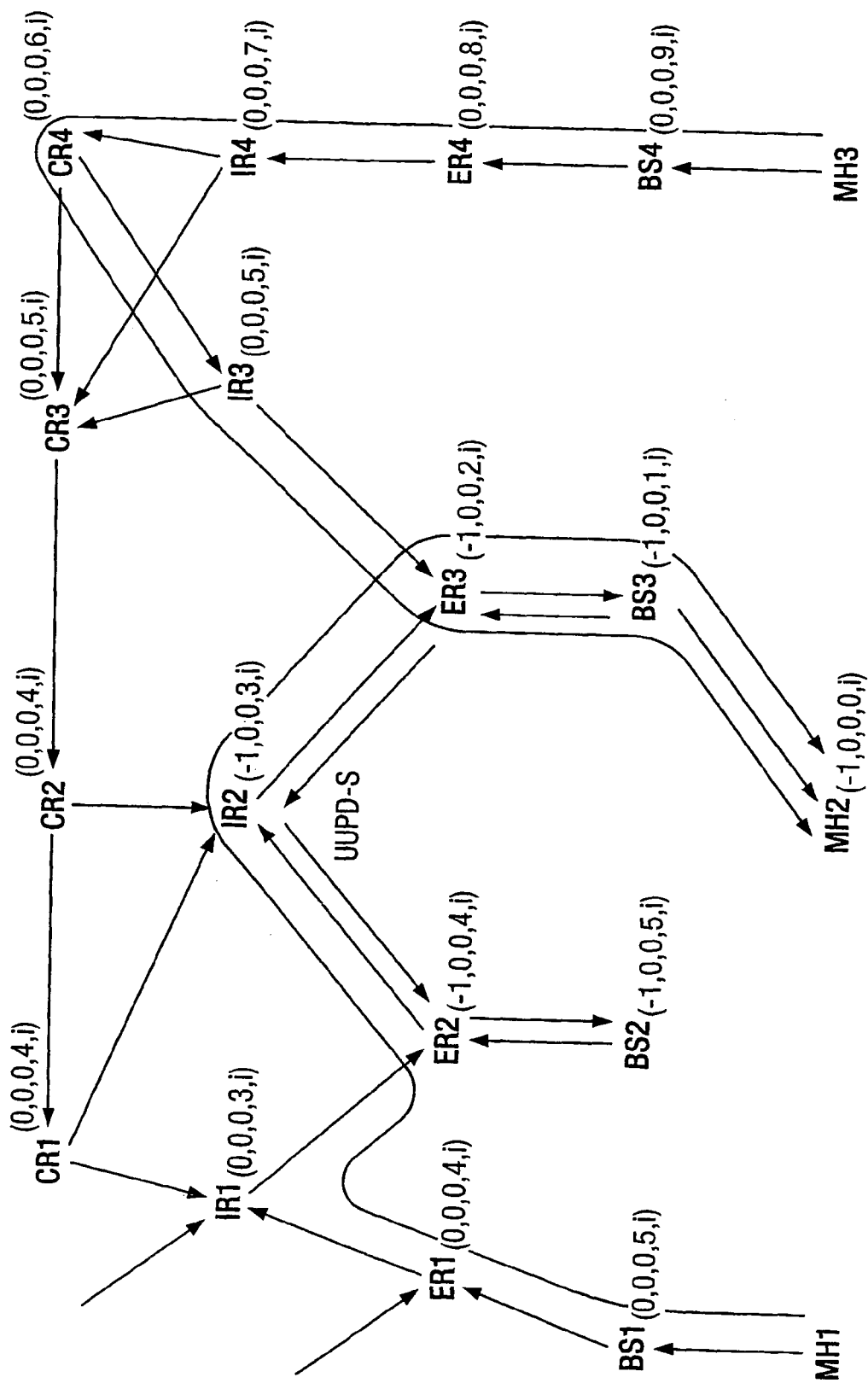

Referring to FIG. 11, it will be remembered that node ER2 is also a branching node. Once the UUPD-S packet has passed through node ER2 (and therefore once its routing protocol data table and next hop forwarding table has been updated) node ER2 only has one downstream link, that directed towards access node IR2. Therefore, packet duplication at node ER2 ceases at this time. The UUPD-S is finally forwarded to the old access node BS2.

Figure 12:
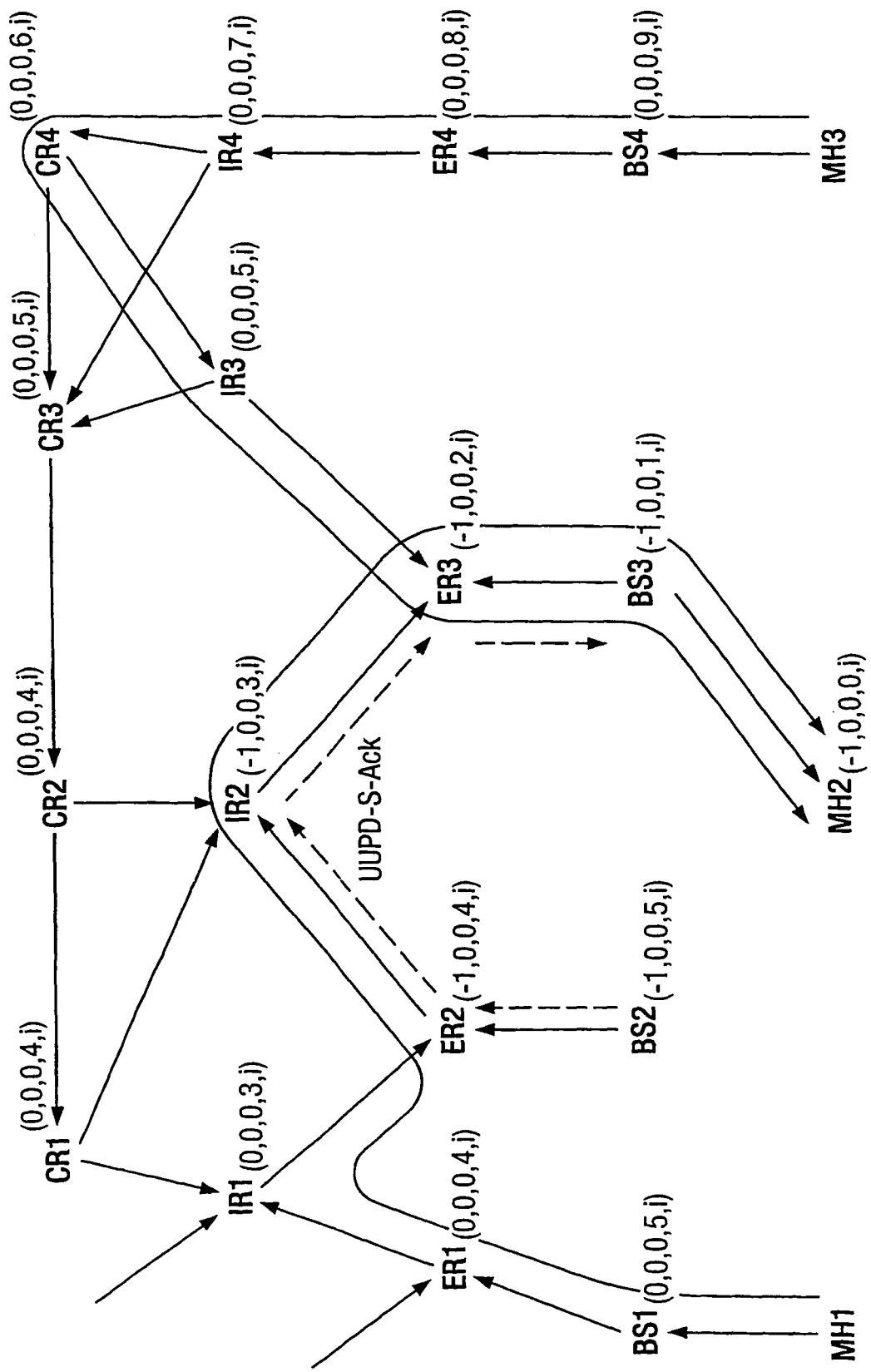

Referring to FIG. 12, on receipt of the UUPD-S message, the home access node BS2 may transmit an update complete acknowledgement UUPD-S-Ack packet towards the new access node BS3. The UUPD-S-Ack packet follows the unicast-updated routing path established in the DAG towards the new access node BS3. On transmission of the UUPS-S-Ack packet, the old access node BS2 relinquishes control of the DAG for the IP address it originally allocated to the mobile host MH2. On receipt of the UUPS-S-Ack packet, the new access node BS3 takes control of the DAG for the IP address of the mobile node.

The routing update associated with the handover of the mobile host at the radio link layer is now complete, involving the redefinition of the height of only a limited number of nodes (in the example in FIG. 12, only five nodes) along the unicast update path.

Figure 13:
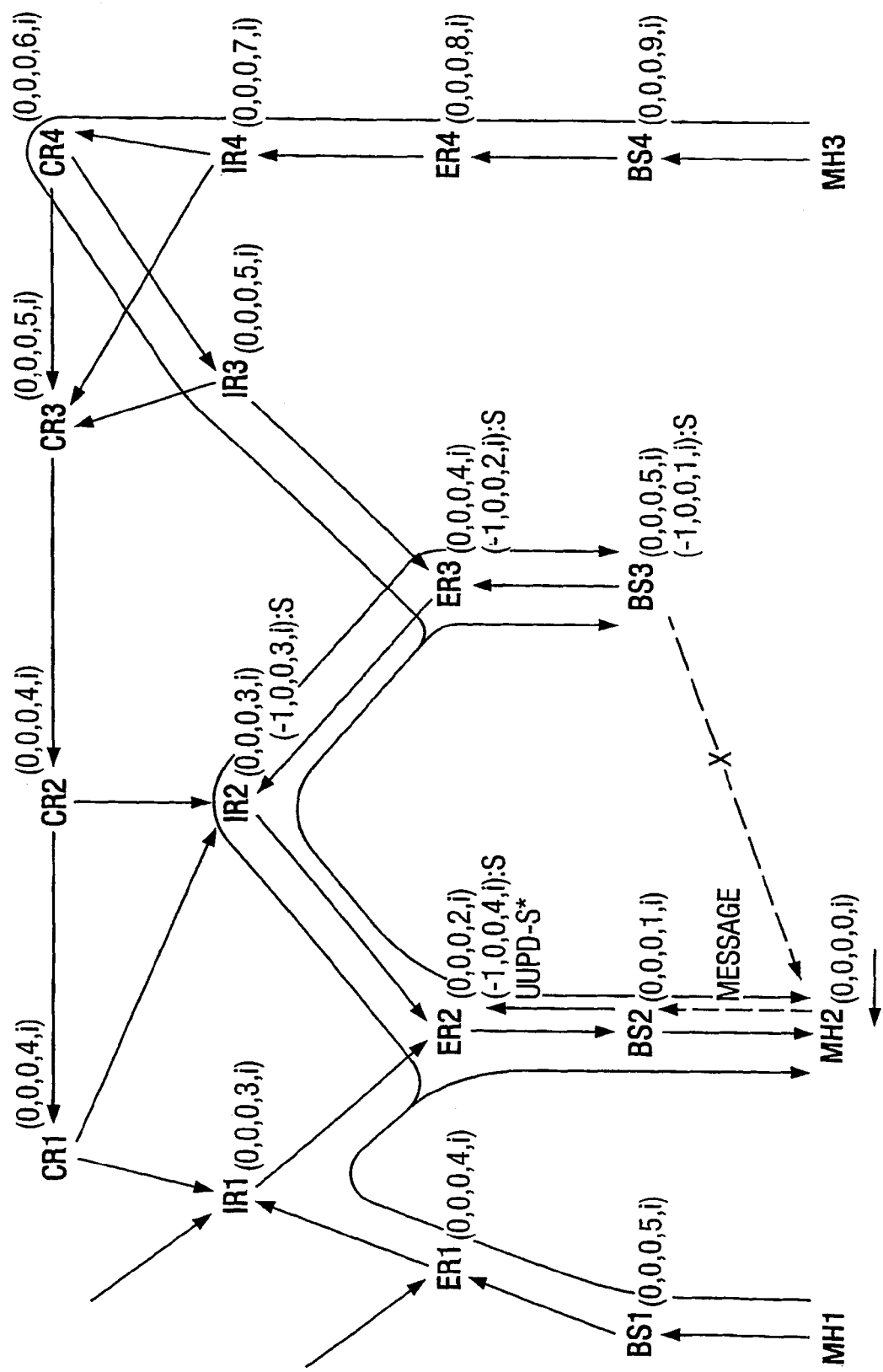
FIGS. 13 and 14 illustrate the restoration of routing to a home base station in accordance with an embodiment of the invention.
Figure 14:
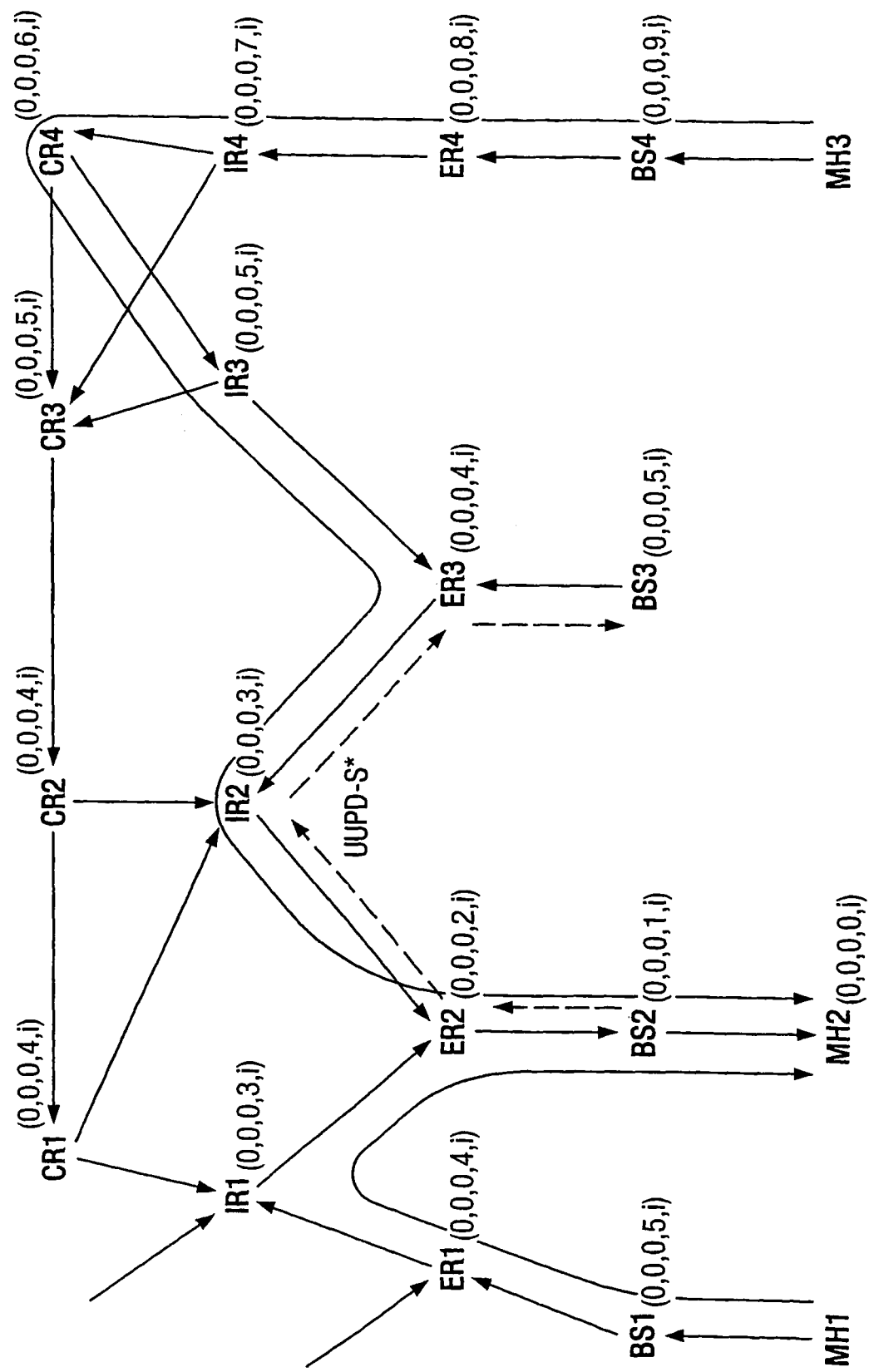

FIGS. 13 and 14 illustrate a procedure whereby, when a mobile host MH2 loses its link to the new access node BS3 (having been connected to both the new access node BS3 and the old access node BS2 as in FIG. 8), routing updates are performed which restore the DAG for the IP address of MH2 to the condition of the DAG before the IP address was originally allocated to MH2. The routing update procedure involves routing updates being transmitted to only a limited number of nodes in the AS (along the paths along which unicast mobility-related updates were previously transmitted), and updates are required in the routing protocol data tables of only a limited number of nodes (the nodes long which the restored directed routing update messages pass and each immediately adjacent node).

Figure 21:
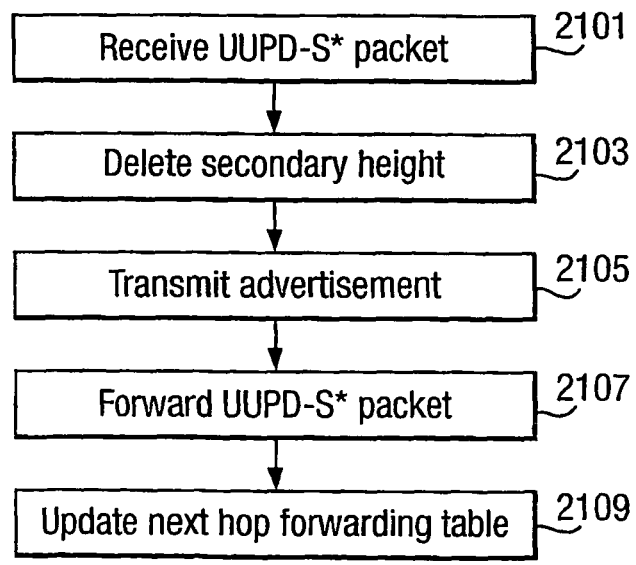

Referring to FIG. 13, when the mobile host MH2 loses its link to the new access node BS3 (having been connected to both the new access node BS3 and the old access node BS2 as in FIG. 8), it sends a message to the old access node BS2 indicating that it has lost the secondary connection with the new access node BS3. (Since the secondary connection is lost, the secondary height associated with the mobile is lost too.) The old access node BS2 interprets this message as an instruction to generate a UUPD-S* packet. The reaction of a node to receiving a UUPD-S* packet will now be described with reference to FIG. 21.

After receiving an UUPD-S* packet (step 2101) the node deletes its additional, secondary height from its routing protocol data table (step 2103). The node then transmits an advertisement of this deletion to each of its neighbouring nodes (step 2105), the propagation of these advertisements being limited to one hop. Each neighbouring node can therefore update their routing protocol data table. Then, the node transmits the UUPD-S* packet towards the next node (step 2107) and finally it updates its next hop forwarding table (step 2109).

Referring once again to FIG. 13, having received a message from the mobile host MH2 indicating a loss of connection with the new access node BS3, the old access node BS2 generates a UUPD-S* packet. It deletes its secondary height from its routing protocol data table, transmits an advertisement of the deletion to its one-hop neighbours (i.e. access node ER2), forwards the UUPD-S* packet to node ER2 and updates its next hop forwarding table.

Referring to FIG. 14, once the UUPD-S* packet has reached the branching node ER2 and once node ER2's routing protocol data table has been updated, packet duplication at node ER2 ceases since node ER2 will only have one downstream link; that towards node BS2. Similarly, once the UUPD-S* packet has reached the branching node ER3 and once its routing protocol data table has been updated, packet duplication at node ER3 ceases since node ER3 will only have one downstream link; that towards node IR2.

Figure 15:
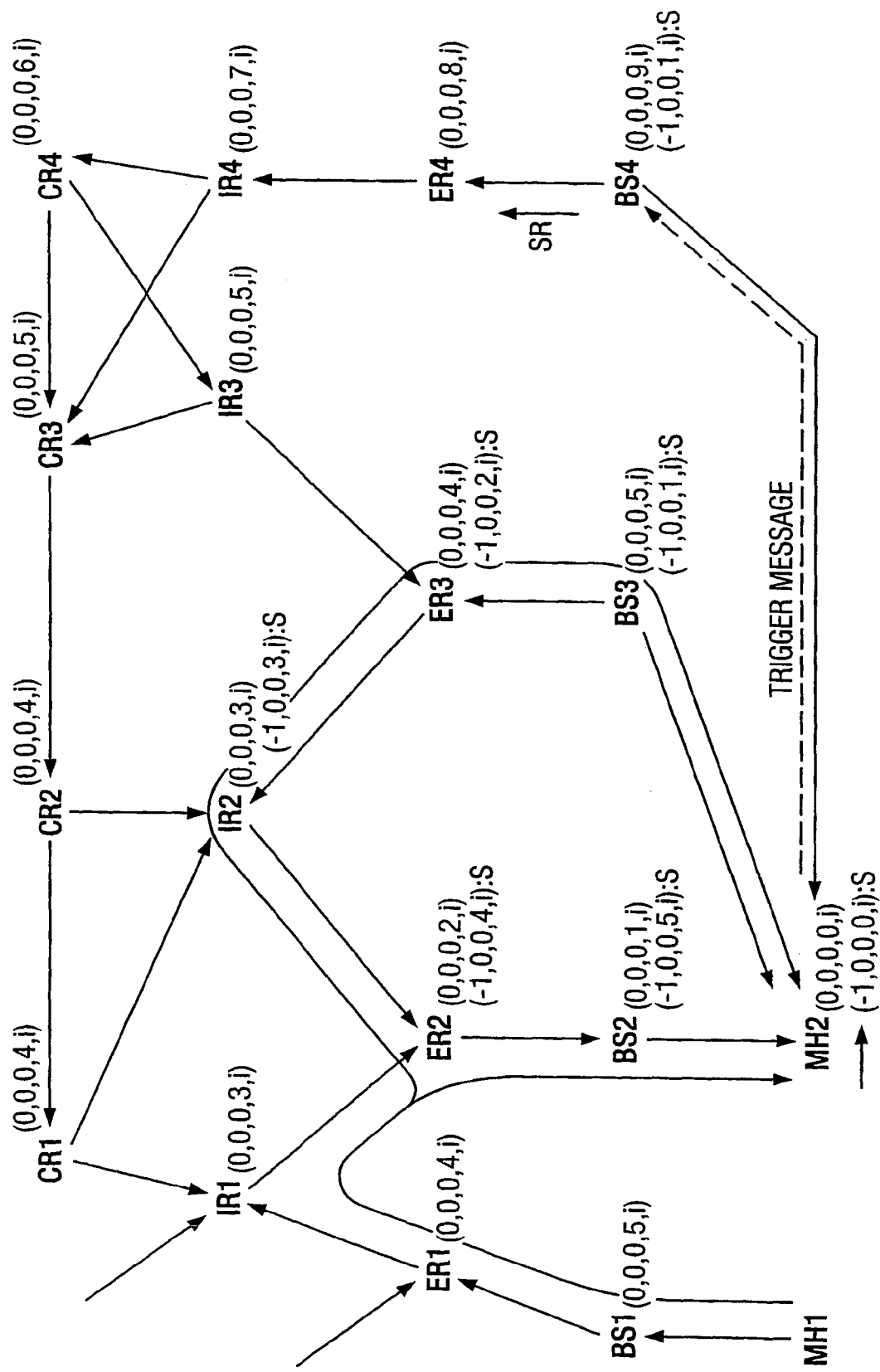
FIGS. 15 to 17 illustrate inter-base station handover and the accompanying routing updates in accordance with a further embodiment of the invention.
Figure 16:
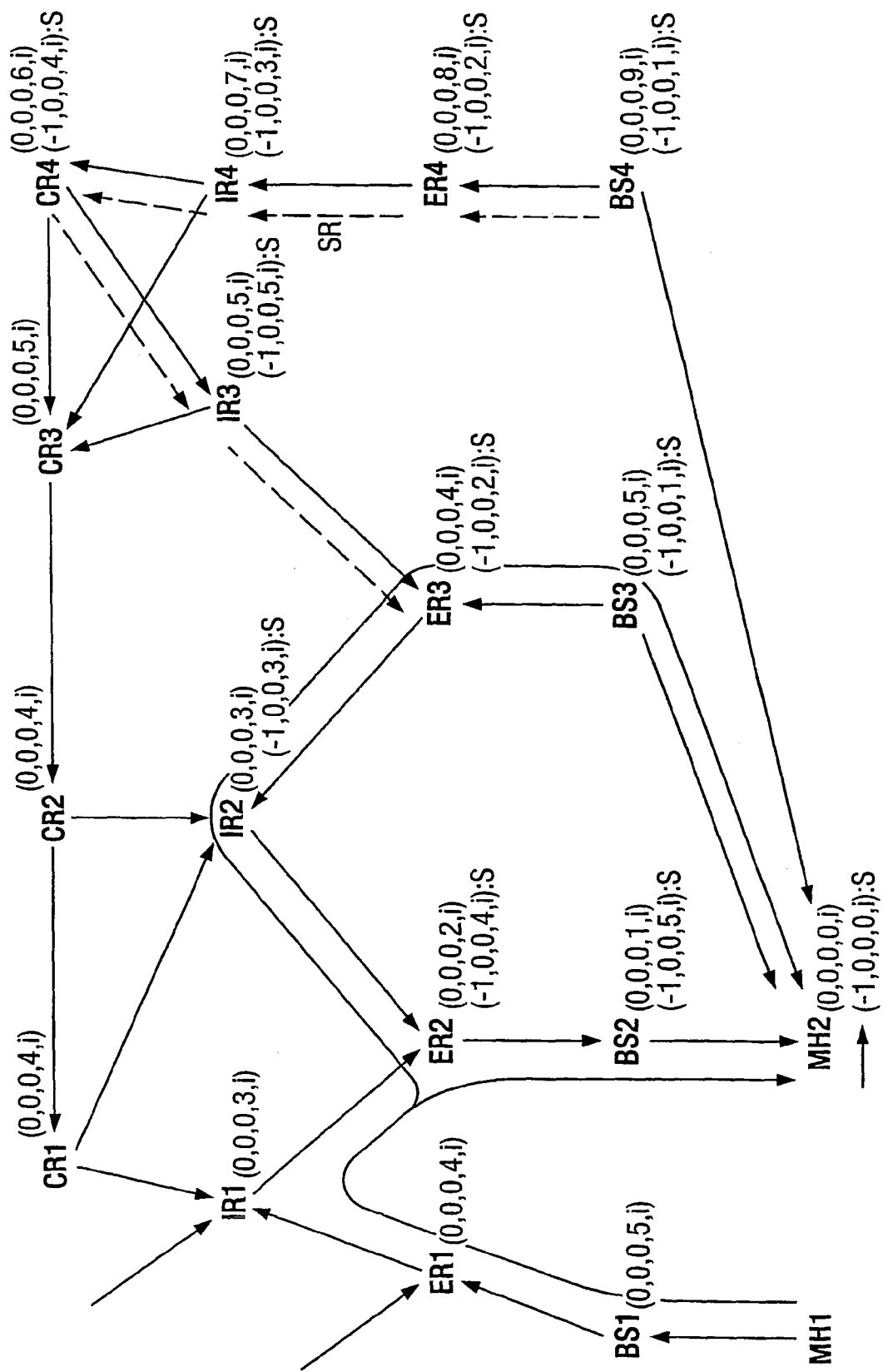
Figure 17:
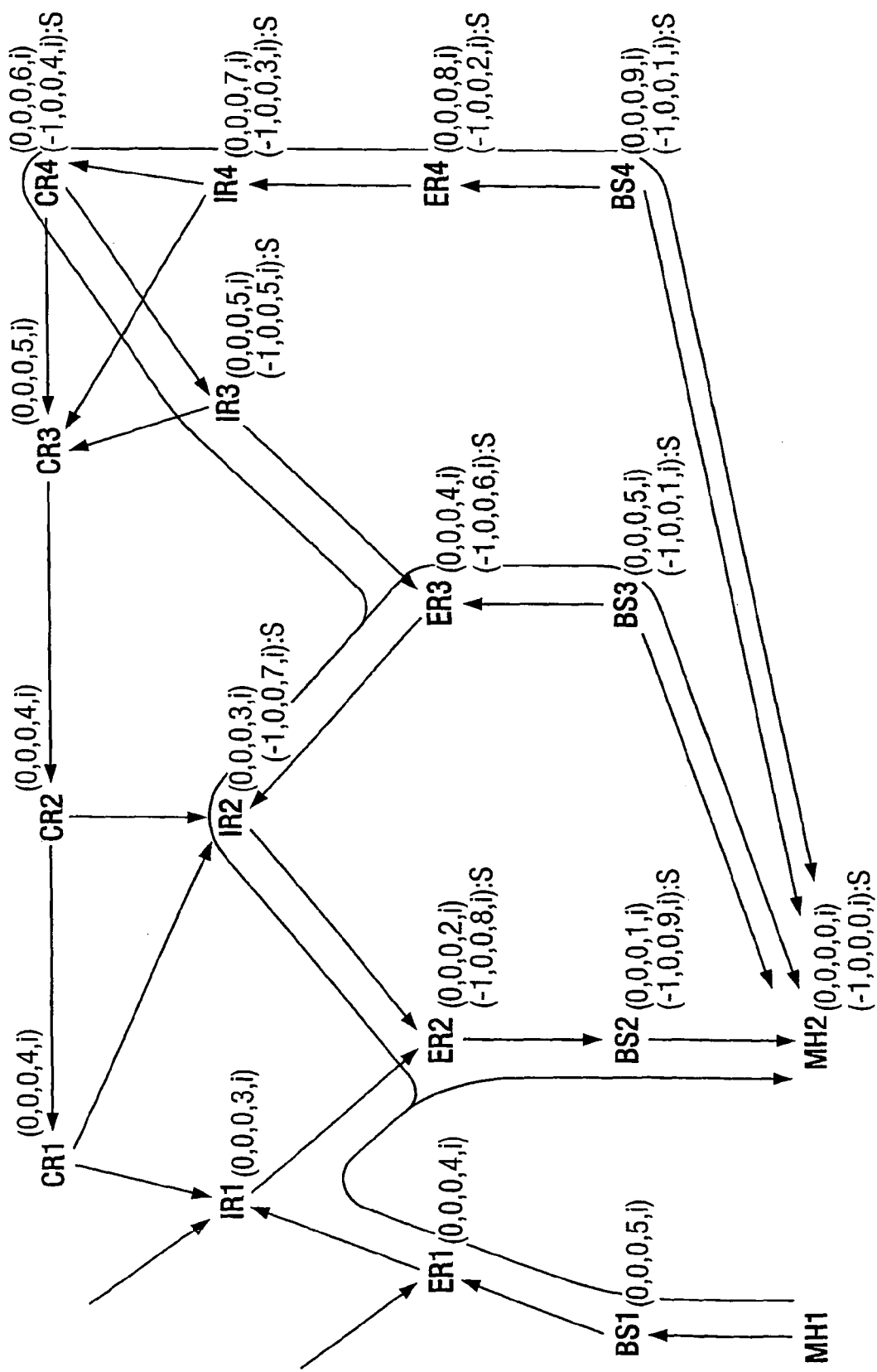

FIGS. 15-17 illustrate what happens if a mobile node which has already established a link to a new access node (in addition to an old link to an old access node) comes into range of a further access node.

Referring to FIG. 15, data packets are being forwarded to the mobile host MH2 via the new link from new access node BS3, in addition to data arriving at MH2 via the old link through the home access node BS2, when a further access node BS4 comes into range. The mobile host MH2 sends a trigger message to this further access node BS4. The trigger message is identical to the trigger message sent previously to access node BS3. The access node BS4 interprets the trigger message as an instruction to generate a unicast directed SR packet. This SR packet is to travel along a unicast path between the access node BS4 and the home access node BS2. Like before, as the SR packet is forwarded, each router adds an additional, secondary height into its routing protocol data table.

Referring to FIG. 16, the SR is transmitted via nodes ER4, IR4, CR4 and IR3 to node ER3 which is the first router along the path back to the home access router BS2 that already has a secondary height stored in its routing protocol data table. If propagation of the SR packet was to cease now the secondary height of node ER3 would remain (−1,0,0,2,i):S while that of node IR3 would have been set to (−1,0,0,5,i):S. In other words node IR3 would be upstream of node ER3 and it would not be possible to transmit data packets from node ER3 to node IR3 and onward to the access node BS4 for transmission to the mobile host MH2. Consequently, referring to FIG. 17, the routing protocol data table of node ER3 is updated to reflect its new secondary height of (−1,0,0,6,i):S. Node ER3 now has three downstream links; a primary one directed towards the home access node BS2 and also two secondary ones directed towards access nodes BS3 and BS4. Data packets arriving at node ER3 directed to MH2 are multicast, that is to say they are copied and a copy is forwarded to node ER2 along the primary link and copies are also forwarded to nodes BS3 and BS4 along the secondary links according to the process described above in relation to FIG. 19.

Propagation of the SR packet continues to the old access node BS2, via nodes 1R2 and ER2, updating their routing protocol data tables too.

Data packets are now forwarded to mobile host MH2 via links from access nodes BS3 and BS4, in addition to data arriving at the mobile via the old link through home access node BS2.

If the mobile host MH2 subsequently loses its links to access nodes BS3 and BS4 then, like before in relation to FIG. 13, it sends a message to the old access node BS2 indicating such a loss of connection. The old access node BS2 generates a UUPD-S* packet and transmits it towards both access nodes BS3 and BS4. The packet follows the secondary paths established and causes the deletion of all secondary height entries in the routing protocol data tables of all nodes along the paths and all nodes immediately adjacent to nodes along the paths.

If, however, the link to access node BS3 is preferred or the links to access nodes BS2 and BS4 are lost then the mobile host MH2 sends a message to access node BS3. Handoff is triggered by the access node BS3 generating a UUPD-S packet. Like before, in relation to FIG. 9, the UUPD-S packet is to travel along a unicast path between the access node BS3 and the home access node BS2 causing both the deletion of the old height entries and the promotion of the secondary height entries (by removing the ":S" suffix) in the routing protocol data tables of all nodes along the update path and all nodes immediately adjacent to the nodes along that path. It will be realised that if the UUPD-S packet was to simply travel to the home access node BS2 along the path between it and access node BS3 then the routers between BS4 and ER3 (namely BS4, ER4, IR4, CR4 and IR3) would maintain secondary height entries in their routing protocol data tables. Since the link between MH2 and access node BS4 has been lost this is no longer desirable. Therefore, when the UUPD-S packet reaches node ER3, the UUPD-S packet is copied and modified to become a UUPD-S* packet which is to travel along a unicast path between node ER3 and the access node BS4 causing the deletion of the secondary height entries in the routing protocol data tables of all nodes along the update path and all nodes immediately adjacent to the nodes along that path.

It is to be appreciated that the above described embodiments are not intended to be limiting, and that modifications and variations will be envisaged by the person skilled in the art.

Although in the above described embodiments, the routing protocol assigns heights with packets flowing from a node having a high height to a low height, all such heights and adjustments to those heights could be inverted and data could be required to flow from low heights to greater heights.

The above-described embodiments describe a modified routing protocol based on the TORA routing protocol. However, aspects of the invention may be used to modify other known routing protocols, such as OSPF, RIP, etc.

Furthermore, although in the above described embodiments the infrastructure of the Autonomous System is fixed, it is to be appreciated that one or more of the routers in the infrastructure may be mobile routers, such as used in the field of satellite communications, and other systems in which one or more routers in the infrastructure are mobile in use.

The invention claimed is:

1. A method of routing packets in a packet network, said packet network including a chain of packet nodes, said chain comprising first and second access nodes for communicating with one or more mobile nodes and one or more intermediate packet nodes, said one or more intermediate packet nodes providing a path interconnecting said first and second access nodes, said method comprising the steps of:
   installing, in said intermediate packet nodes, first routing data defining a first routing path in one direction along said chain to a mobile node via said first access node and second routing data defining a second routing path in the opposite direction along said chain to said mobile node via said second access node;
   operating each of said intermediate packet nodes to:
   determine, on receipt of a packet destined for said mobile node, whether said packet is from another node on said chain or not; and
   a) if the packet is determined to be from a node not on said chain, copying the packet and routing said copy along one of said routing paths and routing said packet along the other of said routing paths; and
   b) if the packet is determined to be from another node on said chain, route said packet along said chain only in the direction in which it is currently travelling.

2. A method according to claim 1, wherein said packet(s) include(s) a unique address of the mobile node.

3. A method according to claim 1, wherein said unique address is the same before and after a handover of the mobile node from the first access node to the second access node.

4. A method according to claim 3 further comprising the steps of operating each node in the packet network:
   a) to associate a routing value with said unique address;
   b) responsive to the receipt of said packet at said node to forward said packet towards another node having a lower routing value associated with said unique address;
   c) responsive to the creation of a wireless link between a mobile node having said unique address and said node to reduce said routing value associated with said unique address to a lower value than that associated with said unique address by the other nodes in said network.

5. A method according to claim 3, wherein said first routing data are installed prior to the handover of said mobile node from said first access node to said second access node.

6. A method according to claim 3, wherein said second routing data include data indicating that said second routing data relates to the handover of said mobile node from said first access node to said second access node.

7. A method according to claim 1, wherein said second routing data are installed in response to a routing control message generated at said second access node and transmitted to said first access node.

8. A method according to claim 1, wherein said first access node and said second access node are wireless access nodes and wherein said packets are sent to and received from said mobile node via a wireless transmission system.

9. A packet network including a chain of packet nodes, said chain comprising:
   first and second access nodes for communicating with one or more mobile nodes; and
   one or more intermediate packet nodes providing a path interconnecting said first and second access nodes; said intermediate packet nodes having installed therein first routing data defining a first routing path in one direction along said chain to a mobile node via said first access node and second routing data defining a second routing path in the other direction along said chain to said mobile node via said second access node each intermediate packet node being arranged in operation to determine, on receiving a packet destined for said mobile node, whether said packet is from another node on said chain or not and a) if the packet is determined to be from a node not on said chain, copying the packet and routing said copy along one of said routing paths and routing said packet along the other of said routing paths; and b) if the packet is determined to be from another node on said chain, route said packet along said chain only in the direction in which it is currently travelling.

10. A packet node for use in a packet network according to claim 9.

11. A computer readable medium storing a computer program or suite of computer programs arranged such that when executed by a computer they perform the method steps as set out in claim 1.

* * * * *

UNITED STATES PATENT AND TRADEMARK OFFICE
CERTIFICATE OF CORRECTION

PATENT NO.        : 8,473,633 B2
APPLICATION NO.   : 10/537896
DATED             : June 25, 2013
INVENTOR(S)       : Philip L Eardley Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2336 days.

Signed and Sealed this
Eighth Day of September, 2015

Michelle K. Lee
*Director of the United States Patent and Trademark Office*